United States Patent
Tan et al.

(10) Patent No.: US 12,100,170 B2
(45) Date of Patent: Sep. 24, 2024

(54) MULTI-LAYER IMAGE REGISTRATION

(71) Applicant: GE Precision Healthcare LLC, Milwaukee, WI (US)

(72) Inventors: Tao Tan, Nuenen (NL); Balázs Péter Cziria, Budapest (HU); Pál Tegzes, Budapest (HU); Gopal Biligeri Avinash, Concord, CA (US); German Guillermo Vera Gonzalez, Menomonee Falls, WI (US); Lehel Mihály Ferenczi, Dunakeszi (HU); Zita Herczeg, Szeged (HU); Ravi Soni, San Ramon, CA (US); Dibyajyoti Pati, Dublin, CA (US)

(73) Assignee: GE Precision Healthcare LLC, Waukesha, WI (US)

( * ) Notice: Subject to any disclaimer, the term of this patent is extended or adjusted under 35 U.S.C. 154(b) by 386 days.

(21) Appl. No.: 17/543,283

(22) Filed: Dec. 6, 2021

(65) Prior Publication Data
US 2023/0177706 A1    Jun. 8, 2023

(51) Int. Cl.
*G06T 7/30*      (2017.01)
*G06F 18/214*    (2023.01)

(52) U.S. Cl.
CPC ............. *G06T 7/30* (2017.01); *G06F 18/214* (2023.01); *G06T 2207/20081* (2013.01); *G06T 2207/20084* (2013.01)

(58) Field of Classification Search
CPC ............. G06T 7/30; G06T 2207/20081; G06T 2207/20084; G06F 18/214
See application file for complete search history.

(56) References Cited

PUBLICATIONS

Zhou, Yujia, et al. "Unsupervised deformable medical image registration via pyramidal residual deformation fields estimation." arXiv preprint arXiv:2004.07624 (2020). (Year: 2020).*

Velte, Maurice. Semantic image segmentation combining visible and near-infrared channels with depth information. Diss. PhD thesis, Bonn-Rhein-Sieg University of Applied Sciences, 2015. (Year: 2015).*

Ferrante, Enzo, et al. "Weakly supervised learning of metric aggregations for deformable image registration." IEEE journal of biomedical and health informatics 23.4 (2019): 1374-1384. (Year: 2019).*

Balakrishnan, G. et al | VoxelMorph: A Learning Framework for Deformable Medical Image Registration. arXiv:1809.05231v3 [cs.CV] Sep. 1, 2019, 16 pages.

(Continued)

*Primary Examiner* — Vu Le
*Assistant Examiner* — Tracy Mangialaschi
(74) *Attorney, Agent, or Firm* — Amin, Turocy & Watson, LLP

(57) ABSTRACT

Systems/techniques that facilitate multi-layer image registration are provided. In various embodiments, a system can access a first image and a second image. In various aspects, the system can generate, via execution of a machine learning model on the first image and the second image, a plurality of registration fields and a plurality of weight matrices that respectively correspond to the plurality of registration fields. In various instances, the system can register the first image with the second image based on the plurality of registration fields and the plurality of weight matrices.

20 Claims, 23 Drawing Sheets

(56) References Cited

PUBLICATIONS

Song, Y. et al. | "Detection of coronary calcifications with dual energy chest X-rays: clinical evaluation". The International Journal of Cardiovascular Imaging, Published online Oct. 28, 2020, https://doi.org/10.1007/s10554-020-02072-4, 8 pages.

* cited by examiner

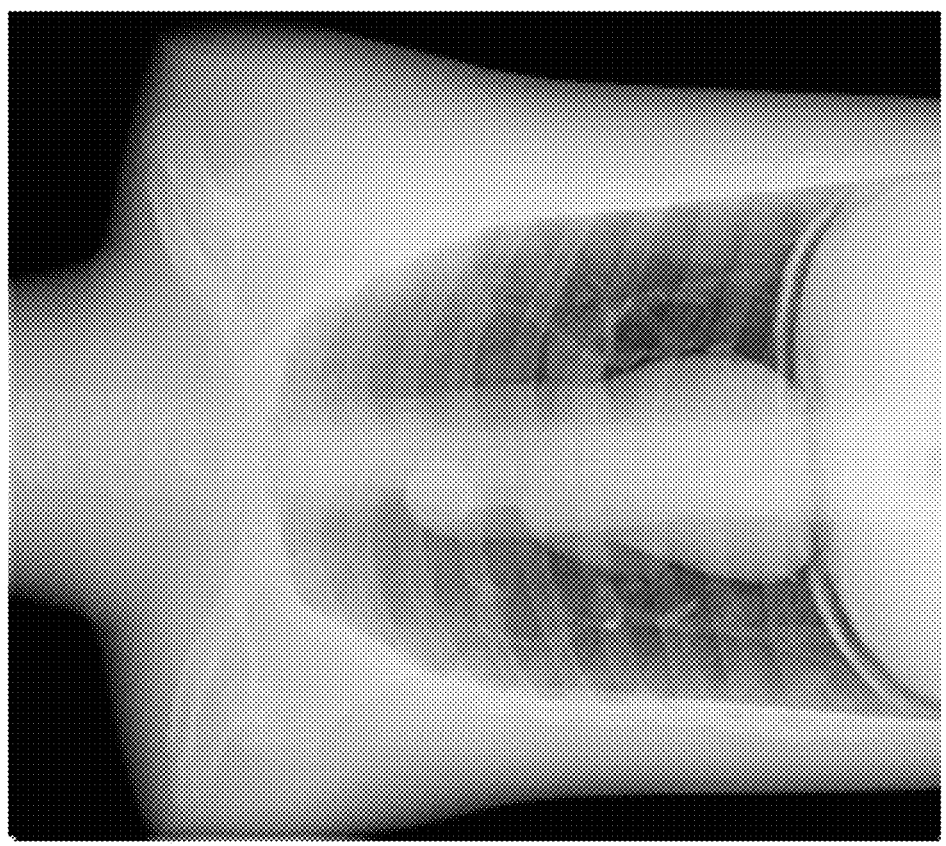
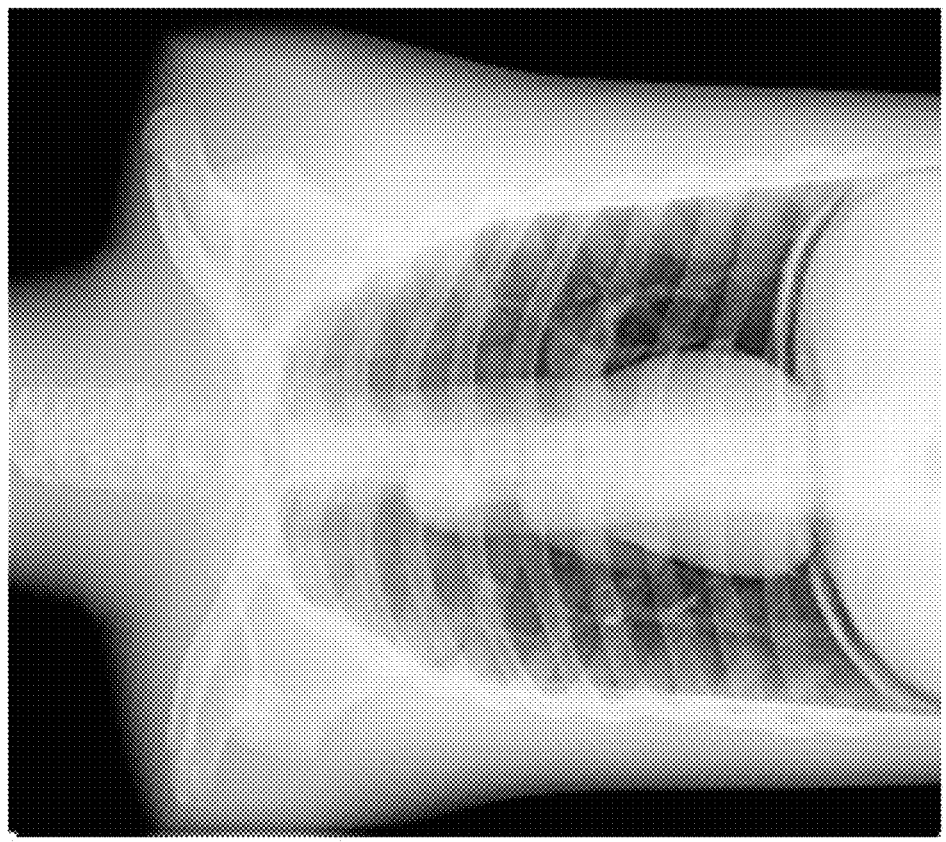
FIG. 13

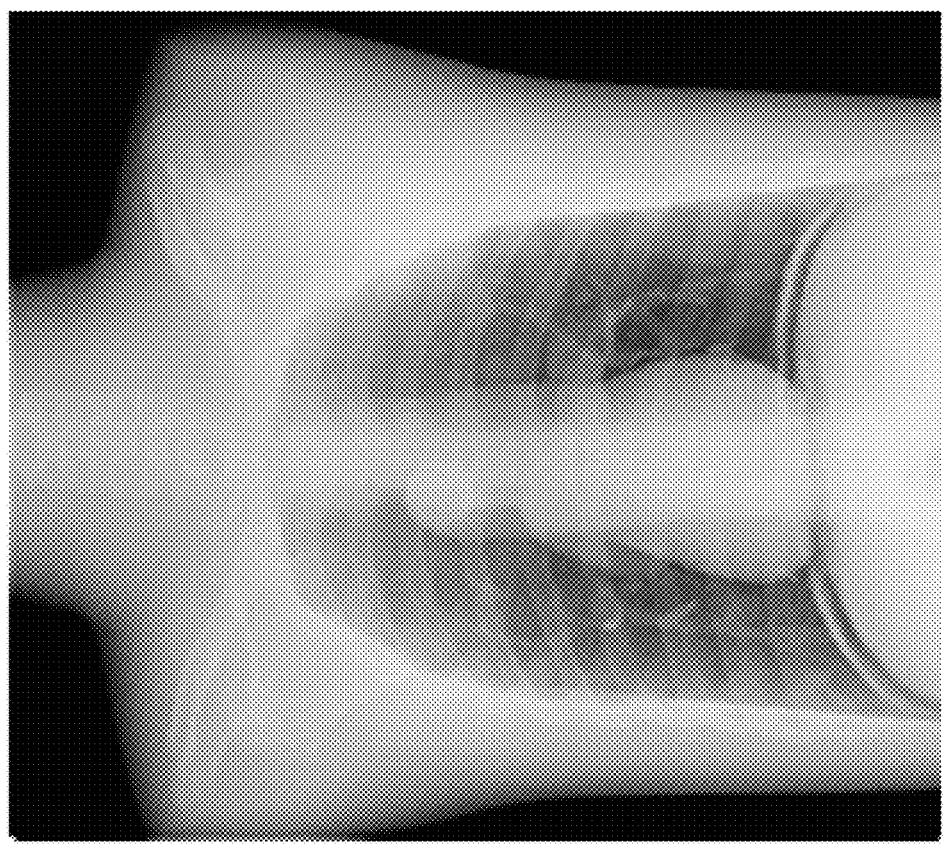
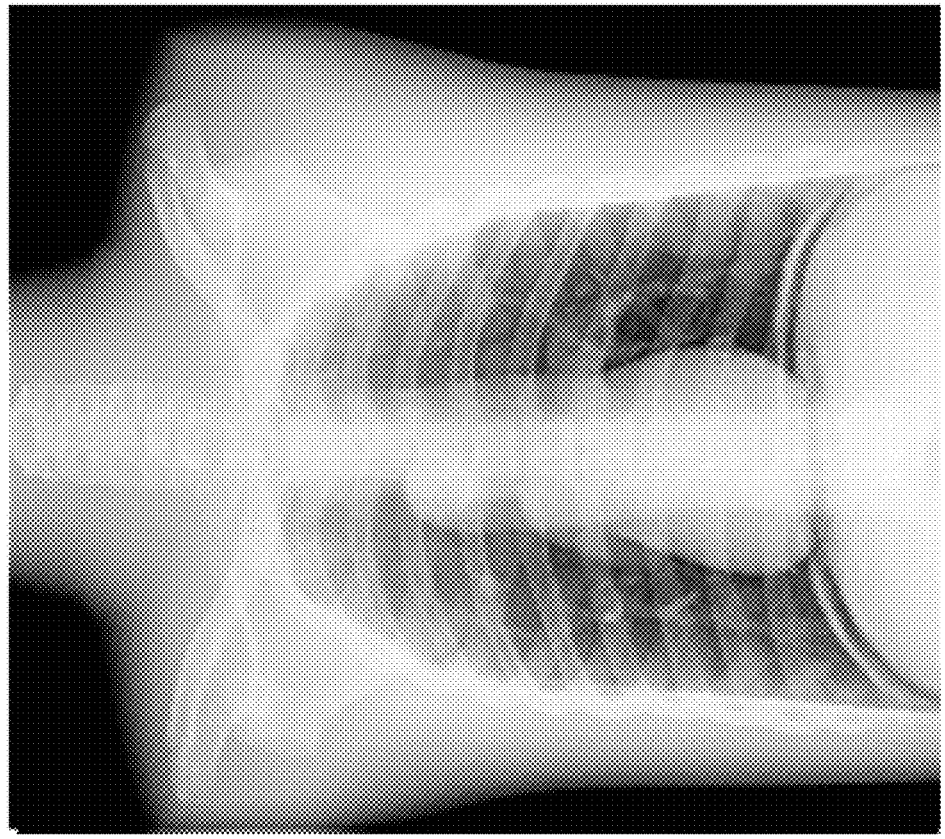
FIG. 14

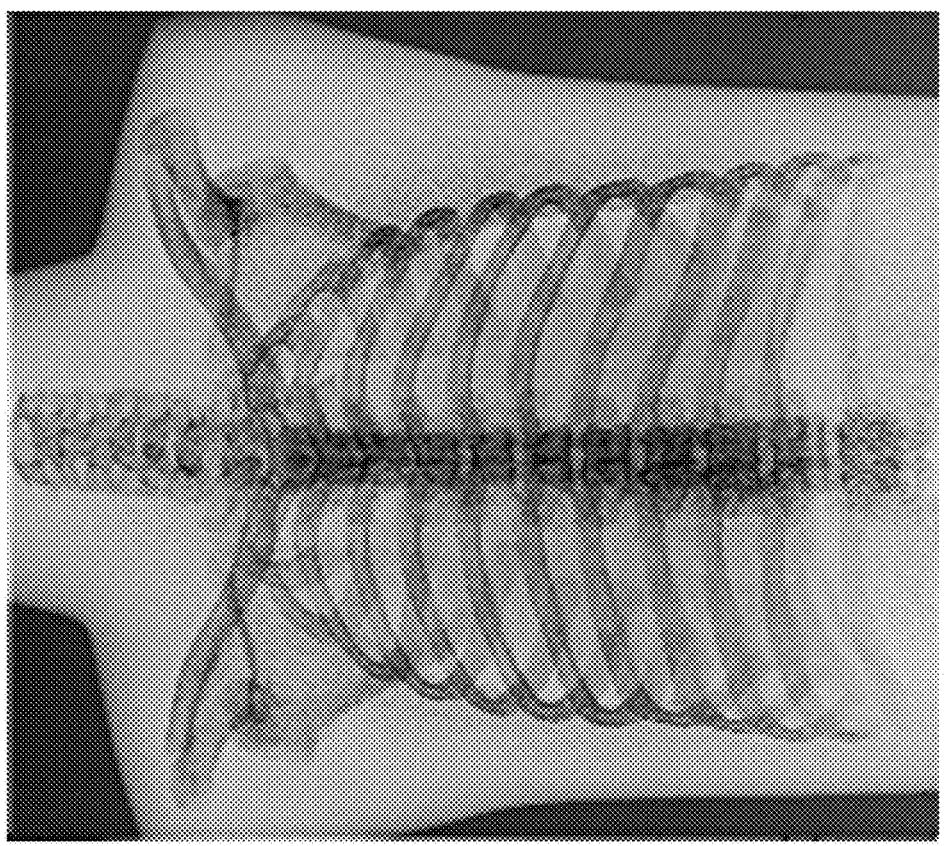
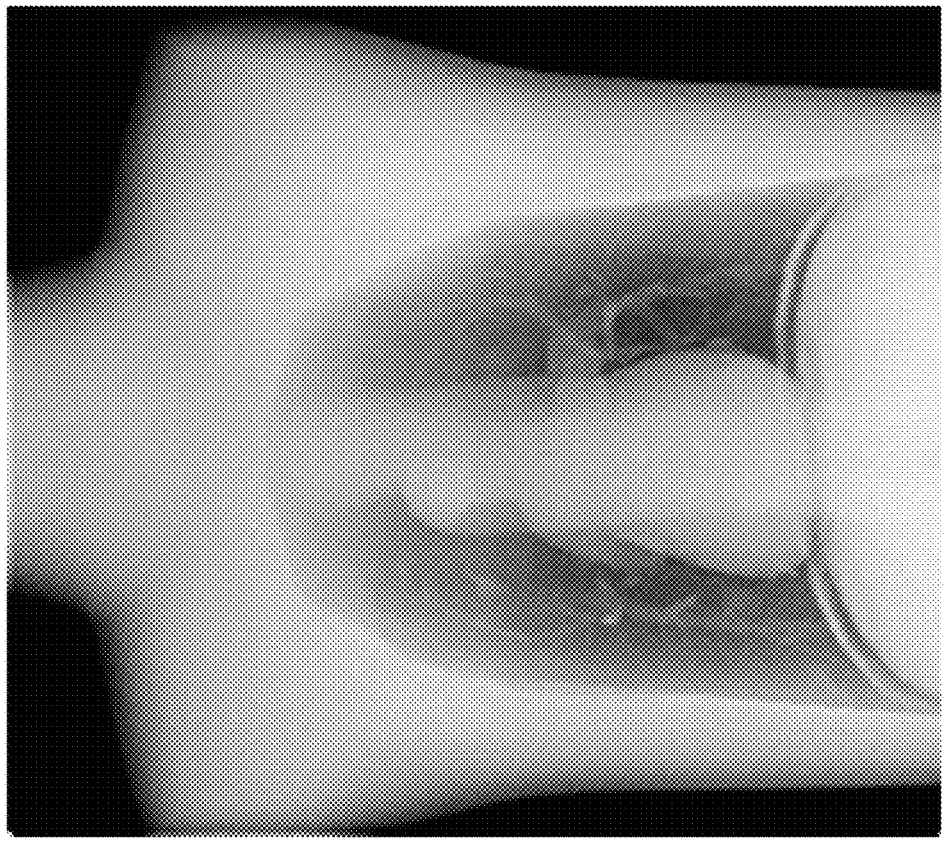
FIG. 15

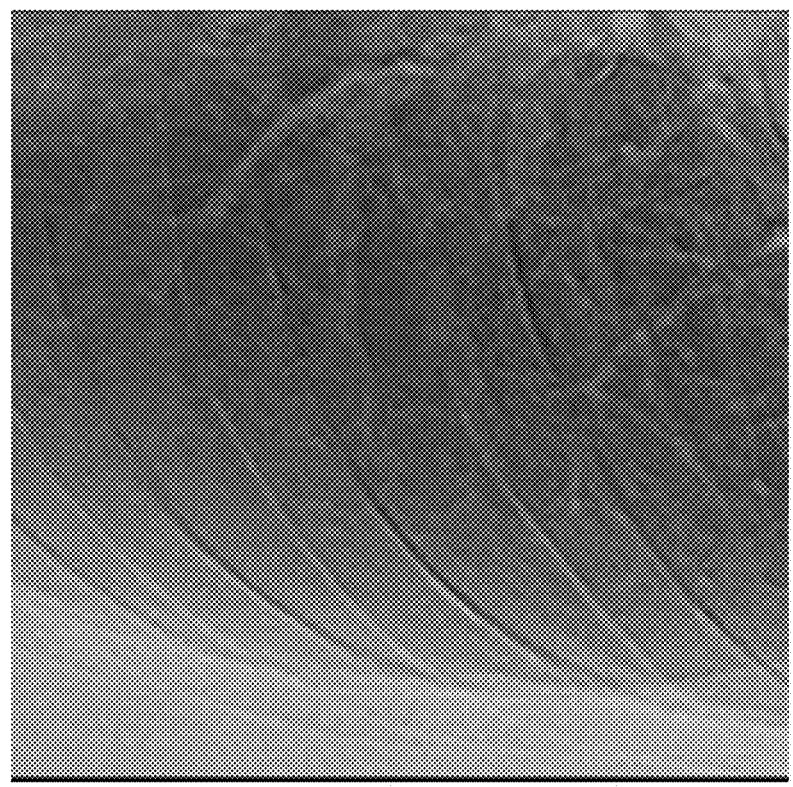
FIG. 16

MULTI-LAYER IMAGE REGISTRATION

TECHNICAL FIELD

The subject disclosure relates generally to image registration, and more specifically to multi-layer image registration.

BACKGROUND

Image registration is the process of aligning one two-dimensional image with another two-dimensional image, such that both images have corresponding orientations or feature locations. In the medical context, two-dimensional images (e.g., X-ray images) can be considered as projections of a three-dimensional entity (e.g., of an anatomical structure of a patient). Different two-dimensional images of a same anatomical structure can be captured according to different energy/radiation levels and different exposure times, so that the different two-dimensional images better depict different types of tissues of the anatomical structure. However, the different types of tissues of the anatomical structure can experience contradictory movements during generation of the different two-dimensional images. In other words, as different types of tissues of the anatomical structure are projected onto each other in the different two-dimensional images, the motions of each of such different types of tissues can be contradictory with respect to their projected locations in the different two-dimensional images. In such situation, implementation of different energy/radiation levels and different exposure times can cause the different two-dimensional images to capture such contradictory movements. The result is that the different two-dimensional images can be unable to be properly registered/aligned with each other, which can cause significant artefacts or distortions. Unfortunately, existing techniques offer no solution to improper registration/alignment due to contradictory tissue movements.

Accordingly, systems and/or techniques that can address one or more of these technical problems can be desirable.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate multi-layer image registration are described.

According to one or more embodiments, a system is provided. The system can comprise a computer-readable memory that can store computer-executable components. The system can further comprise a processor that can be operably coupled to the computer-readable memory and that can execute the computer-executable components stored in the computer-readable memory. In various embodiments, the computer-executable components can comprise a receiver component. In various aspects, the receiver component can access a first image and a second image. In various embodiments, the computer-executable components can further comprise a field component. In various instances, the field component can generate, via execution of a machine learning model on the first image and the second image, a plurality of registration fields and a plurality of weight matrices that respectively correspond to the plurality of registration fields. In various embodiments, the computer-executable components can further comprise a registration component. In various cases, the registration component can register the first image with the second image based on the plurality of registration fields and the plurality of weight matrices.

According to one or more embodiments, the above-described system can be implemented as a computer-implemented method and/or a computer program product.

DESCRIPTION OF THE DRAWINGS

FIGS. 13-20 illustrate example, non-limiting images associated with various embodiments described herein.

DETAILED DESCRIPTION

Figure 1:
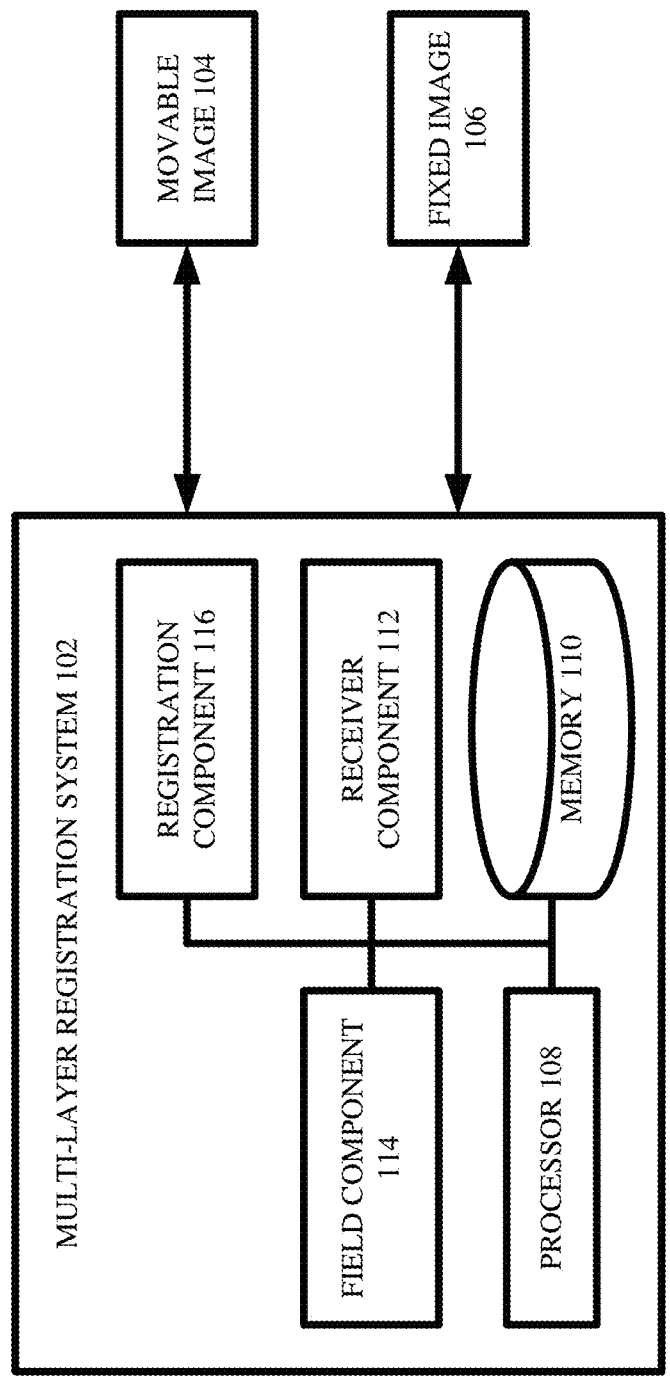
FIG. 1 illustrates a block diagram of an example, non-limiting system that facilitates multi-layer image registration in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Image registration is the process of aligning one two-dimensional image with another two-dimensional image, such that both images have corresponding orientations (e.g., such that the features depicted in the two images have the same orientations).

In the medical context, different images of a same anatomical structure (e.g., different X-ray images of the same anatomical structure, different computed tomography (CT) images of the same anatomical structure, different magnetic resonance imaging (MRI) images of the same anatomical structure, different ultrasound images of the same anatomical structure, different positron emission tomography (PET) images of the same anatomical structure) can be captured according to different energy/radiation levels and different exposure times. Such different energy/radiation levels and different exposure times can cause the different images to better depict different types of tissues (e.g., bone tissue versus soft tissue) of the anatomical structure. However, the different types of tissues of the anatomical structure can experience contradictory movements (e.g., due to breathing, heartbeat, and/or patient motion during scanning), and such different energy/radiation levels and different exposure times can cause the different images to capture such contradictory movements. The result can be that the different images can be unable to be properly registered/aligned with each other, which can yield significant artefacts and/or distortions.

As a non-limiting example, consider a dual energy X-ray scan of a patient's chest cavity. In various cases, a low-dose and/or low-exposure-time X-ray scan of the patient's chest cavity from a given vantage point can yield a first image of the patient's chest cavity that depicts soft tissue better than bone tissue. On the other hand, a high-dose and/or high-exposure-time X-ray scan of the patient's chest cavity from the given vantage point can yield a second image of the patient's chest cavity that depicts bone tissue better than soft tissue. Because the high-dose and/or high-exposure-time X-ray scan can consume more time than the low-dose and/or low-exposure-time X-ray scan, various features (e.g., patient's heart, patient's lungs, patient's ribs) depicted in the first image can have slightly different positions than the same features depicted in the second image. Such different positions of the same features can prevent the first image from being able to be properly aligned/registered with the second image. Moreover, such improper alignment/registration can cause significant artefacts (e.g., shadows, phantom edges, optical distortions) to appear after postprocessing of the first and second images, which can negatively influence diagnoses that are made based on the first and second images. For instance, soft tissue decomposition applied to the first image can create many bone tissue artefacts, and bone tissue decomposition applied to the second image can create many soft tissue artefacts. Unfortunately, existing techniques offer no solution to improper registration/alignment caused by contradictory tissue movements.

Accordingly, systems and/or techniques that can address one or more of these technical problems can be desirable.

Various embodiments of the subject innovation can address one or more of these technical problems. One or more embodiments described herein include systems, computer-implemented methods, apparatus, and/or computer program products that can facilitate multi-layer image registration. In various aspects, the inventors of various embodiments described herein recognized why existing image registration techniques fail to ameliorate the problem of contradictory tissue movement in medical images. Specifically, when given a movable image (e.g., an image to be shifted) that is desired to be registered/aligned with a fixed image (e.g., an image that is not to be shifted), existing image registration techniques involve generating a registration field which indicates pixel-wise shift vectors that can be applied to the movable image, so as to shift the pixels of the movable image to be in alignment with the pixels of the fixed image. The present inventors realized that existing techniques cannot adequately deal with the problem of contradictory tissue movement precisely because such existing techniques implement only a single registration field.

In particular, different types of tissues which can experience contradictory movements can often be superimposed on one another in the movable image, such that one pixel in the movable can represent two or more different types of tissues. For example, a patient's heart can experience a different movement than the patient's ribs (e.g., due to breathing and/or heartbeats), but the ribs can be superimposed on top of and/or in front of the heart (e.g., from the perspective of a medical scanning device) such that some pixels in the movable image simultaneously represent both heart tissue and rib tissue. When only a single registration field is implemented, each pixel of the movable image is given only one shift vector, including pixels that represent two or more different types of tissues. However, as the present inventors recognized, a single shift vector for a pixel that represents two or more different types of tissues cannot describe and/or capture the contradictory movements of the two or more different types of tissues (e.g., the shift vector can describe the movement of any one of the different types of tissues represented by the pixel, but the shift vector cannot describe the contradictory movements of all of the different types of tissues represented by the pixel at once).

Accordingly, the present inventors devised the herein-described solution to this problem, which involves implementing a plurality (e.g., two or more) of registration fields, such that each pixel in the movable image can have more than one shift vector, where each shift vector of a given pixel can be considered as representing the shift and/or movement of a corresponding type of tissue that is represented by that given pixel. In other words, various embodiments described herein can be considered as a computerized tool (e.g., any suitable combination of computer-executable hardware and/or computer-executable software) that can receive as input a movable image and a fixed image, and that can register the movable image with the fixed image by leveraging a plurality of registration fields.

In various embodiments, the computerized tool described herein can comprise a receiver component, a field component, and/or a registration component.

In various embodiments, the receiver component of the computerized tool can electronically receive and/or otherwise electronically access a movable image and a fixed image. In some instances, the receiver component can electronically retrieve the movable image and/or the fixed image from any suitable centralized and/or decentralized data structure (e.g., graph data structure, relational data structure, hybrid data structure), whether remote from and/or local to the receiver component. In other instances, the receiver component can electronically retrieve the movable image and/or the fixed image from any suitable imaging device (e.g., X-ray scanner, CT scanner, MRI scanner, ultrasound scanner, PET scanner) that captured/generated the movable image and/or the fixed image. In any case, the receiver component can electronically obtain and/or access the movable image and/or the fixed image, such that other components of the computerized tool can electronically interact with (e.g., read, write, edit, manipulate) the movable image and/or the fixed image.

In various aspects, the movable image can be any suitable two-dimensional medical image (e.g., an X-ray pixel array, a CT pixel array, an MRI pixel array, an ultrasound pixel array, a PET pixel array) that depicts any suitable anatomical structure (e.g., body part, organ, tissue, and/or any suitable portion thereof) of a patient (e.g., human, animal, and/or otherwise). In various instances, the fixed image can be any suitable two-dimensional medical image that corresponds to the movable image. For example, the fixed image can have the same dimensionality (e.g., same number of pixels) as the movable image and can depict the same anatomical structure as the movable image. However, in various aspects, the fixed image can be generated via application of a different energy/ radiation level and/or a different exposure time as compared to the movable image, such that the anatomical structure in the fixed image can be in a slightly different position as compared to the anatomical structure in the movable image. In any case, it can be desired to register and/or align the movable image with the fixed image. In various aspects, the computerized tool described herein can facilitate such registration and/or alignment.

In various embodiments, the field component of the computerized tool can electronically store, electronically maintain, electronically control, and/or otherwise electronically access a machine learning model. In various aspects, the machine learning model can exhibit any suitable artificial intelligence architecture as desired. For example, the machine learning model can exhibit a deep learning neural network architecture. In such case, the machine learning model can include any suitable number of layers (e.g., input layer, one or more hidden layers, output layer), can include any suitable numbers of neurons in various layers (e.g., different layers can have the same and/or different numbers of neurons as each other), can include any suitable activation functions (e.g., softmax, sigmoid, hyperbolic tangent, rectified linear unit) in various neurons (e.g., different neurons can have the same and/or different activation functions as each other), and/or can include any suitable interneuron connections (e.g., forward connections, skip connections, recurrent connections).

In any case, the machine learning model can be configured to receive as input both the movable image and the fixed image, and to produce as output both a plurality of registration fields and a plurality of weight matrices that respectively correspond to the plurality of registration fields. In various aspects, each registration field can be a vector field that indicates how pixels of the movable image should be shifted. In other words, each registration field can be a matrix that has the same dimensionality as the movable image (e.g., the number and/or arrangement of the elements in the registration field can be equal to the number and/or arrangement of pixels in the movable image), each element of such matrix can correspond to a respective pixel of the movable image, and each element of such matrix can be a shift vector indicating a direction in which and/or magnitude by which a respectively corresponding pixel of the movable image should be translated and/or moved. Moreover, in various instances, each weight matrix can indicate how much weight and/or importance is to be given to the pixel-wise shift vectors of a respectively corresponding registration field. That is, each weight matrix can correspond to a respective registration field, such weight matrix can have the same dimensionality as the respective registration field (e.g., the number and/or arrangement of elements in the weight matrix can be equal to the number and/or arrangement of elements in the registration field), each element of such weight matrix can correspond to a shift vector of the respective registration field, and each element of such weight matrix can be a scalar that indicates an amount of importance and/or weight assigned to a respectively corresponding shift vector of the respective registration field. In various instances, for any given pixel in the movable image, the sum of the weights assigned to all of the shift vectors for that given pixel (e.g., one shift vector for that given pixel in each registration field, and one weight value for that given pixel in each weight matrix) can be equal to unity.

In any case, the field component can electronically generate the plurality of registration fields and the plurality of weight matrices by executing the machine learning model on the movable image and the fixed image. More specifically, in various aspects, the movable image and the fixed image can be concatenated together and fed to an input layer of the machine learning model, the movable image and the fixed image can complete a forward pass through one or more hidden layers of the machine learning model, and an output layer of the machine learning model can compute the plurality of registration fields and the plurality of weight matrices based on activations from the one or more hidden layers.

In various embodiments, the registration component of the computerized tool can electronically generate a registered image based on the plurality of registration fields and the plurality of weight matrices, where the registered image can be considered as a version of the movable image that is aligned with the fixed image. As a non-limiting example, the registration component can apply each of the plurality of registration fields to the movable image thereby yielding a plurality of registered image layers (e.g., each registered image layer can be the result of translating the pixels of the movable image according to the shift vectors of a respective registration field), the registration component can perform element-wise multiplication between respective pairs of the plurality of registered image layers and the plurality of weight matrices thereby yielding a plurality of weighted and registered image layers (e.g., each weighted and registered image layer can be the result of multiplying in element-wise fashion a respective registered image layer by a respective weight matrix), and the registration component can sum the plurality of weighted and registered image layers together to form the registered image.

As another non-limiting example, the registration component can apply each of the plurality of weight matrices to the movable image thereby yielding a plurality of weighted image layers (e.g., each weighted image layer can be the result of performing element-wise multiplication between the movable image and a respective weight matrix), the registration component can respectively apply the plurality of registration fields to the plurality of weighted image layers thereby yielding a plurality of weighted and registered image layers (e.g., each weighted and registered image layer can be the result of translating the pixels of a respective weighted image layer according to the shift vectors of a respective registration field), and the registration component can sum the plurality of weighted and registered image layers together to form the registered image.

As yet another non-limiting example, the registration component can electronically store, maintain, control, and/or otherwise access a registration machine learning model (e.g., exhibiting any suitable artificial intelligence architecture), that is configured to receive as input both the plurality of registration fields and the plurality of weight matrices, and that is configured to produce as output the registered image.

In any case, the registration component can electronically generate the registered image based on the plurality of registration fields and the plurality of weight matrices.

In some embodiments, the computerized tool can further comprise an execution component that can electronically transmit the registered image to any suitable computing device as desired and/or that can electronically render the registered image on any suitable computing monitor, display, and/or screen as desired.

In some other embodiments, the computerized tool can further comprise a training component that can train the machine learning model of the field component in a supervised and/or unsupervised fashion so that the machine learning model can learn how to accurately infer registration fields and/or weight matrices based on inputted pairs of images, as described in more detail herein.

In any case, and as experimentally verified by the present inventors, implementation of the plurality of registration fields as described herein can result in registered images that do not exhibit (and/or that otherwise exhibit significantly reduced) distortions and/or artefacts that are normally associated with contradictory movement of different types of tissue. In various cases, such improved registration can be due to the fact that each of the plurality of registration fields can be considered as indicating shift vectors of a particular type of tissue. In other words, each pixel can have multiple shift vectors (e.g., one shift vector from each registration field), and each of such multiple shift vectors can be considered as capturing the movement of a respectively corresponding type of tissue. Accordingly, a single pixel that represents two or more different types of tissues can have multiple shift vectors, and such multiple shift vectors can fully capture contradictory movements of those two or more different types of tissue. On the other hand, when only a single registration field is implemented, each pixel has only a single shift vector. Thus, a pixel that represents two or more different types of tissue can have only one shift vector, and such one shift vector cannot fully capture contradictory movements of those two or more different types of tissue.

Various embodiments of the subject innovation can be employed to use hardware and/or software to solve problems that are highly technical in nature (e.g., to facilitate multi-layer image registration), that are not abstract and that cannot be performed as a set of mental acts by a human. Further, some of the processes performed can be performed by a specialized computer (e.g., deep learning neural network) for carrying out defined tasks related to multi-layer image registration. For example, such defined tasks can include: accessing, by a device operatively coupled to a processor, a first image and a second image; generating, by the device and via execution of a machine learning model on the first image and the second image, a plurality of registration fields and a plurality of weight matrices that respectively correspond to the plurality of registration fields; and registering, by the device, the first image with the second image, based on the plurality of registration fields and the plurality of weight matrices.

Such defined tasks are not performed manually by humans. Indeed, neither the human mind nor a human with pen and paper can electronically receive two images (e.g., two X-ray scans, two CT scans, two MRI scans), electronically execute a machine learning model (e.g., a neural network) on the two images thereby yielding multiple registration fields and multiple weight matrices, and electronically leverage the multiple registration fields and weight matrices to register the two images with each other. Instead, various embodiments of the subject innovation are inherently and inextricably tied to computer technology and cannot be implemented outside of a computing environment (e.g., image registration is an inherently-computerized technique by which disparate images are electronically aligned with each other so as to have comparable orientations; a computerized tool that utilizes a deep learning neural network to facilitate image registration is likewise inherently computerized and cannot be implemented in any sensible, practical, or reasonable way without computers).

Moreover, various embodiments of the subject innovation can integrate into a practical application various teachings described herein relating to multi-layer image registration. As explained above, existing techniques utilize only a single registration field to facilitate image registration. That is, each pixel in a movable image (e.g., an image to be shifted) has only a single shift vector that defines how that pixel should be moved. As mentioned above, the present inventors recognized that implementing only a single registration field (e.g., a single shift vector per pixel) can cause significant artefacts in the medical context when different types of tissue are superimposed over each other in a medical image. More specifically, different types of tissue can have contradictory movements (e.g., one type of tissue can move in one direction and another type of tissue can move in a different direction due to bodily movements like breathing or heartbeats). Accordingly, for a pixel that represents two or more different types of tissue (e.g., two or more different types of tissue that are superimposed on top of each other from the perspective of an imaging device), a single shift vector cannot fully describe the contradictory movements of those two or more different types of tissue. So, facilitating image registration with only a single registration field (e.g., only a single shift vector per pixel) can yield significant artefacts and/or distortion. In stark contrast, the present inventors devised the subject innovation, which can facilitate image registration via a plurality of registration fields. In other words, each pixel can be considered as having multiple shift vectors (e.g., each pixel can have one shift vector from each registration field), which can fully capture the contradictory movements of two or more different types of tissues represented by that pixel. Accordingly, when image registration is implemented via multiple registration fields as described herein, the significant artefacts and/or distortions associated with single registration fields can be eliminated and/or ameliorated. In other words, the computerized tool described herein can facilitate multi-layer image registration, which can solve the shortcomings of existing techniques that implement single-layer image registration. Such a computerized tool constitutes a concrete and tangible technique improvement in the field of image registration and thus certainly qualifies as a useful and practical application of computers.

Furthermore, various embodiments of the subject innovation can control real-world tangible devices based on the disclosed teachings. For example, various embodiments of the subject innovation can electronically receive real-world medical images (e.g., real-world X-ray images), can electronically execute a real-world neural network on such real-world medical images to yield a plurality of registration fields and a plurality of weight matrices, and can electronically generate a real-world registered medical image based on the plurality of registration fields and the plurality of weight matrices.

It should be appreciated that the herein figures and description provide non-limiting examples of the subject innovation and are not necessarily drawn to scale.

FIG. 1 illustrates a block diagram of an example, non-limiting system 100 that can facilitate multi-layer image registration in accordance with one or more embodiments described herein. As shown, a multi-layer registration system 102 can be electronically integrated, via any suitable wired and/or wireless electronic connections, with a movable image 104 and/or a fixed image 106.

In various embodiments, the movable image 104 can be any suitable two-dimensional medical image that depicts any suitable anatomical structures and/or portions thereof of a patient. As some non-limiting examples, the movable image 104 can be a two-dimensional X-ray scan of the patient, a two-dimensional CT scan of the patient, a two-dimensional MRI scan of the patient, a two-dimensional ultrasound scan of the patient, and/or a two-dimensional PET scan of the patient. In various aspects, the movable image 104 can have any suitable number and/or arrangement of pixels. As a non-limiting example, the movable image 104 can be an s-by-t array of pixels, for any suitable positive integers s and t.

In various embodiments, the fixed image 106 can be any suitable two-dimensional medical image that corresponds to the movable image 104. In various aspects, the fixed image 106 can be of a same type as the movable image 104. For example, both the movable image 104 and the fixed image 106 can be X-ray scans, both the movable image 104 and the fixed image 106 can be CT scans, both the movable image 104 and the fixed image 106 can be MRI scans, both the movable image 104 and the fixed image 106 can be ultrasound scans, and/or both the movable image 104 and the fixed image 106 can be PET scans. In various instances, the fixed image 106 can have the same size as the movable image 104. That is, since the movable image 104 can be an s-by-t pixel array, the fixed image 106 can likewise be an s-by-t pixel array. In various aspects, the fixed image 106 can depict the same anatomical structures and/or portions thereof of the same patient as the movable image 104, albeit with such anatomical structures being different locations, positions, and/or orientations as compared to the movable image 104.

In any case, it can be desired to register the movable image 104 with the fixed image 106. In other words, it can be desired to shift and/or translate the pixels of the movable image 104, such that the features (e.g., anatomical structures and/or portions thereof) depicted in the movable image 104 are aligned with the features depicted in the fixed image 106 (e.g., the movable image 104 can be the image whose pixels are shifted, whereas the fixed image 106 can be the image whose pixels are not shifted). In various instances, the multi-layer registration system 102 can facilitate such registration, as described herein.

In various embodiments, the multi-layer registration system 102 can comprise a processor 108 (e.g., computer processing unit, microprocessor) and a computer-readable memory 110 that is operably and/or operatively and/or communicatively connected/coupled to the processor 108. The computer-readable memory 110 can store computer-executable instructions which, upon execution by the processor 108, can cause the processor 108 and/or other components of the multi-layer registration system 102 (e.g., receiver component 112, field component 114, registration component 116) to perform one or more acts. In various embodiments, the computer-readable memory 110 can store computer-executable components (e.g., receiver component 112, field component 114, registration component 116), and the processor 108 can execute the computer-executable components.

In various embodiments, the multi-layer registration system 102 can comprise a receiver component 112. In various aspects, the receiver component 112 can electronically receive and/or otherwise electronically access the movable image 104 and/or the fixed image 106. In various instances, the receiver component 112 can electronically retrieve the movable image 104 and/or the fixed image 106 from any suitable centralized and/or decentralized data structure (not shown). In various other instances, the receiver component 112 can electronically retrieve the movable image 104 and/or the fixed image 106 from any suitable imaging devices (e.g., X-ray scanners, CT scanners, MRI scanners, ultrasound scanners, PET scanners) that captured and/or otherwise generated the movable image 104 and/or the fixed image 106. In any case, the receiver component 112 can electronically obtain and/or access the movable image 104 and/or the fixed image 106, such that other components of the multi-layer registration system 102 can electronically interact with the movable image 104 and/or the fixed image 106.

In various embodiments, the multi-layer registration system 102 can comprise a field component 114. In various aspects, as described herein, the field component 114 can electronically execute a machine learning model on the movable image 104 and/or the fixed image 106, so as to generate a set of registration fields and a set of weight matrices that respectively correspond to the set of registration fields. In various cases, each registration field can indicate pixel-wise shift vectors, and each weight matrix can indicate pixel-wise weight scalars.

In various embodiments, the multi-layer registration system 102 can comprise a registration component 116. In various instances, the registration component 116 can electronically generate a registered image based on the set of registration fields and the set of weight matrices, where the registered image can be considered as a transformed version of the movable image 104, where such transformed version is in alignment with the fixed image 106.

Figure 2:
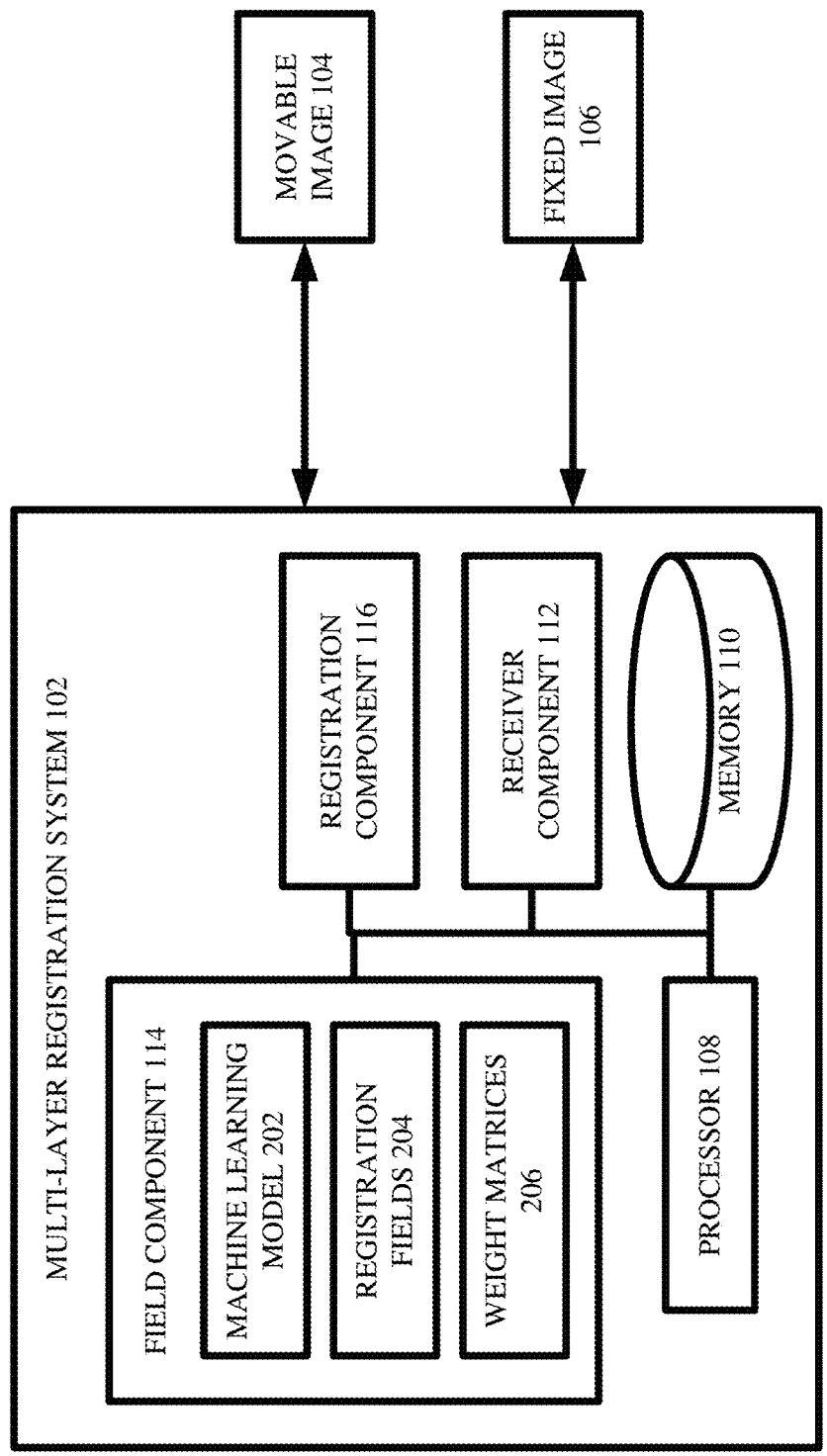
FIG. 2 illustrates a block diagram of an example, non-limiting system including a machine learning model, a set of registration fields, and a set of weight matrices that facilitates multi-layer image registration in accordance with one or more embodiments described herein.

FIG. 2 illustrates a block diagram of an example, non-limiting system 200 including a machine learning model, a set of registration fields, and a set of weight matrices that can facilitate multi-layer image registration in accordance with one or more embodiments described herein. As shown, the system 200 can, in some cases, comprise the same components as the system 100, and can further comprise a machine learning model 202, a set of registration fields 204, and/or a set of weight matrices 206.

In various aspects, the field component 114 can electronically store, electronically maintain, electronically control, and/or otherwise electronically access the machine learning model 202. In various instances, the field component 114 can electronically execute the machine learning model 202 on both the movable image 104 and the fixed image 106, thereby yielding the set of registration fields 204 and the set of weight matrices 206. This is further explained with respect to FIG. 3.

Figure 3:
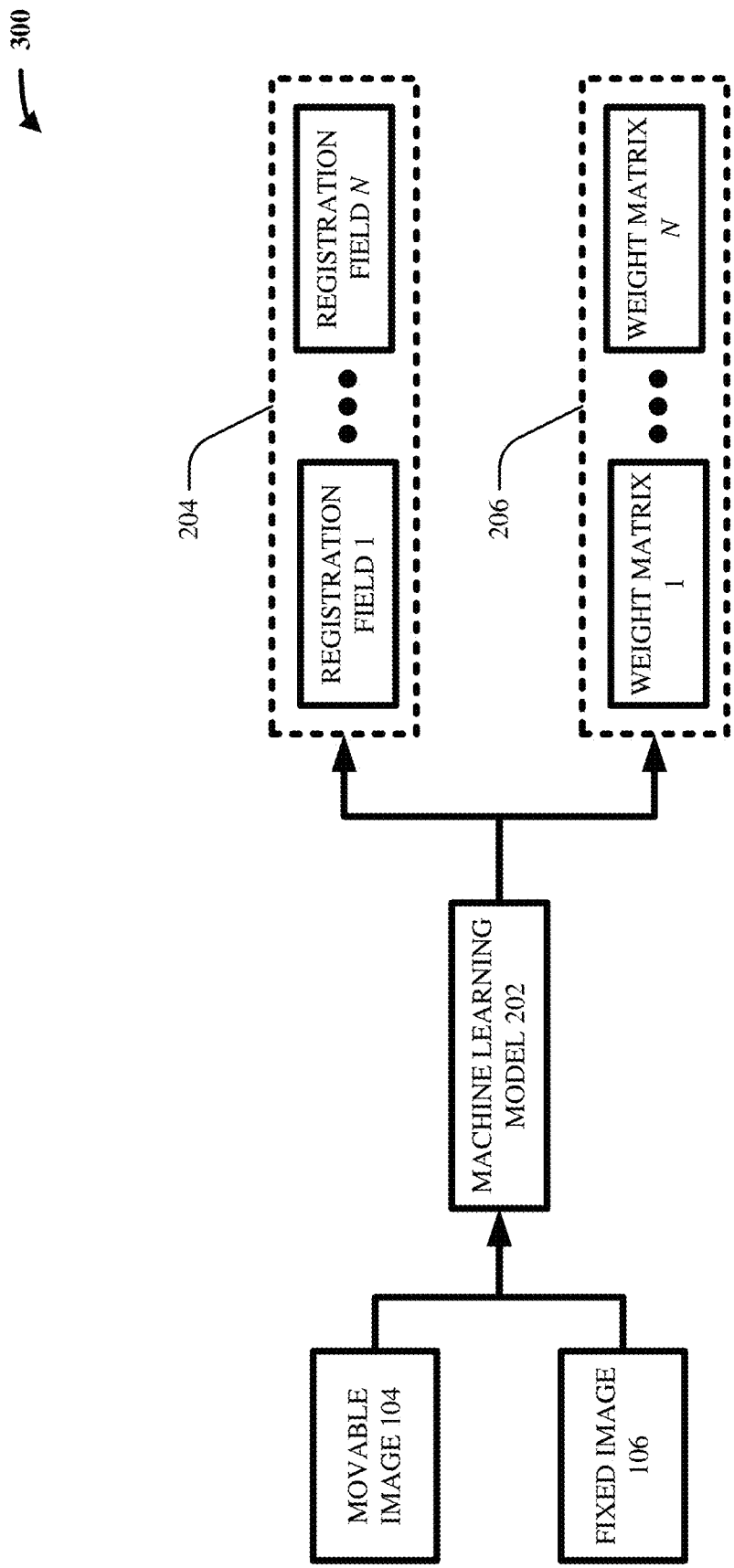
FIG. 3 illustrates an example, non-limiting block diagram showing how a machine learning model can generate a set of registration fields and a set of weight matrices in accordance with one or more embodiments described herein.

FIG. 3 illustrates an example, non-limiting block diagram 300 showing how the machine learning model 202 can generate the set of registration fields 204 and the set of weight matrices 206 in accordance with one or more embodiments described herein.

In various aspects, the machine learning model 202 can have any suitable artificial intelligence architecture as desired. For example, the machine learning model 202 can be a deep learning neural network that has any suitable number of layers, any suitable numbers of neurons in various layers, any suitable activation functions in various neurons, and/or any suitable interneuron connectivity patterns. In various instances, the machine learning model 202 can be configured to receive as input both the movable image 104 and the fixed image 106, and to produce as output both the set of registration fields 204 and the set of weight matrices 206. More specifically, in various aspects, the movable image 104 and the fixed image 106 can be concatenated together, an input layer of the machine learning model 202 can receive such concatenation, such concatenation can complete a forward pass through one or more hidden layers of the machine learning model 202, and an output layer of the machine learning model 202 can compute both the set of registration fields 204 and the set of weight matrices 206 based on activations provided by the one or more hidden layers.

As shown in FIG. 3, the set of registration fields 204 can include n fields for any suitable positive integer n>1: a registration field 1 to a registration field n. In various aspects, as shown, the set of weight matrices 206 can respectively correspond to the set of registration fields 204. That is, since the set of registration fields 204 can include n fields, the set of weight matrices 206 can likewise include n matrices: a weight matrix 1 to a weight matrix n.

In various aspects, each of the set of registration fields 204 can be a vector field that indicates pixel-wise shift vectors for the movable image 104. For example, the registration field 1 can be a matrix that is of the same size as the movable image 104. That is, the number and/or arrangement of elements in the registration field 1 can be equal to the number and/or arrangement of pixels in the movable image 104. Since the movable image 104 can be an s-by-t pixel array, the registration field 1 can be an s-by-t matrix. Moreover, each element of the registration field 1 can be a vector (e.g., as opposed to a scalar) that indicates a direction in which and/or a magnitude by which to shift a respectively corresponding pixel of the movable image 104. For instance, for any suitable pixel (i,j) in the movable image 104, where i and j are integers satisfying i∈[1,s] and j∈[1,t], there can exist an element (i,j) in the registration field 1, where the element (i,j) in the registration field 1 is a two-dimensional vector indicating how the pixel (i,j) of the movable image 104 should be shifted and/or translated.

As another example, the registration field n can be a matrix that is of the same size as the movable image 104. That is, since the movable image 104 can be an s-by-t pixel array, the registration field n can be an s-by-t matrix. Moreover, each element of the registration field n can be a vector that indicates a direction in which and/or a magnitude by which to shift a respectively corresponding pixel of the movable image 104. That is, for any suitable pixel (i,j) in the movable image 104, there can exist an element (i,j) in the registration field n, where the element (i,j) in the registration field n is a two-dimensional vector indicating how the pixel (i,j) of the movable image 104 should be shifted and/or translated.

More generally, $R_k(i,j)$ can represent the shift vector for the pixel (i,j) that is indicated by the k-th registration field of the set of registration fields 204, for any suitable integer k∈[1,n].

Note that, although each of the set of registration fields 204 can be of the same size as each other (e.g., each of the set of registration fields 204 can be an s-by-t vector field), the shift vectors in each of the set of registration fields 204 can vary from each other. For example, consider again the pixel (i,j) in the movable image 104. In various aspects, the registration field 1 can indicate a shift vector $R_1(i,j)$ for the pixel (i,j), and the registration field n can indicate a shift vector Rn(i,j) for the pixel (i,j). However, in various cases, $R_1(i,j)$ can be different from and/or otherwise unequal to Rn(i,j). In any case, the pixel (i,j) in the movable image 104 can have n shift vectors (e.g., one shift vector indicated by one respectively corresponding element in each of the set of registration fields 204). As mentioned above, this stands in stark contrast to existing image registration techniques which implement only a single registration field and thus only a single shift vector per pixel.

In various cases, the set of registration fields 204 can be deformable. In various other cases, the set of registration fields 204 can be rigid. In still other cases, the set of registration fields 204 can include one or more deformable fields and one or more rigid fields.

In various aspects, each of the set of weight matrices 206 can be a matrix that respectively corresponds to a given registration field in the set of registration fields 204 and that indicates pixel-wise weights for that given registration field. For example, the weight matrix 1 can correspond to the registration field 1. Accordingly, the weight matrix 1 can be a matrix that is of the same size as the registration field 1. That is, the number and/or arrangement of elements in the weight matrix 1 can be equal to the number and/or arrangement of elements in the registration field 1. Since the registration field 1 can be an s-by-t vector field, the weight matrix 1 can be an s-by-t matrix. Moreover, each element of the weight matrix 1 can be a scalar (e.g., as opposed to a vector) that indicates a weight and/or a level of importance of a respectively corresponding shift vector in the registration field 1. For instance, for any suitable pixel (i,j) in the movable image 104, the registration field 1 can indicate a shift vector $R_1(i,j)$, and there can exist an element (i,j) in the weight matrix 1, where the element (i,j) in the weight matrix 1 is a scalar that represents a level of importance of the shift vector $R_1(i,j)$.

As another example, the weight matrix n can correspond to the registration field n. Accordingly, the weight matrix n can be a matrix that is of the same size as the registration field n. That is, since the registration field n can be an s-by-t vector field, the weight matrix n can be an s-by-t matrix. Moreover, each element of the weight matrix n can be a scalar (e.g., as opposed to a vector) that indicates a weight and/or a level of importance of a respectively corresponding shift vector in the registration field n. That is, for any suitable pixel (i,j) in the movable image 104, the registration field n can indicate a shift vector $R_n(i,j)$, and there can exist an element (i,j) in the weight matrix n, where the element (i,j) in the weight matrix n is a scalar that represents a level of importance of the shift vector $R_n(i,j)$.

More generally, $W_k(i,j)$ can represent the weight (e.g., scalar) corresponding to the shift vector $R_k(i,j)$ that is indicated by the k-th weight matrix of the set of weight matrices 206, for any suitable integer $k \in [1,n]$.

Note that, although each of the set of weight matrices 206 can be of the same size as each other (e.g., each of the set of weight matrices 206 can be an s-by-t matrix of scalars), the scalars in each of the set of weight matrices 206 can vary from each other. For example, consider again the pixel (i,j) in the movable image 104. As mentioned above, there can be a shift vector $R_1(i,j)$ in the registration field 1 for the pixel (i,j), there can be a shift vector Rn(i,j) in the registration field n for the pixel (i,j), there can be a scalar $W_1(i,j)$ in the weight matrix 1 that is a weight assigned to the shift vector $R_1(i,j)$, and there can be a scalar $W_n(i,j)$ in the weight matrix n that is a weight assigned to the shift vector $R_n(i,j)$. In various cases, $W_1(i,j)$ can be different from and/or otherwise unequal to $W_n(i,j)$. However, in various aspects, the sum of all the weights for the pixel (i,j) can be unity. In other words, for any pixel (i,j) in the movable image 104, it can be the case that $$\sum_{k=1}^{n} W_k(i,j) = 1.$$

In any case, the field component 114 can electronically generate the set of registration fields 204 and the set of weight matrices 206 by executing the machine learning model 202 on the movable image 102 and the fixed image 106.

Figure 4:
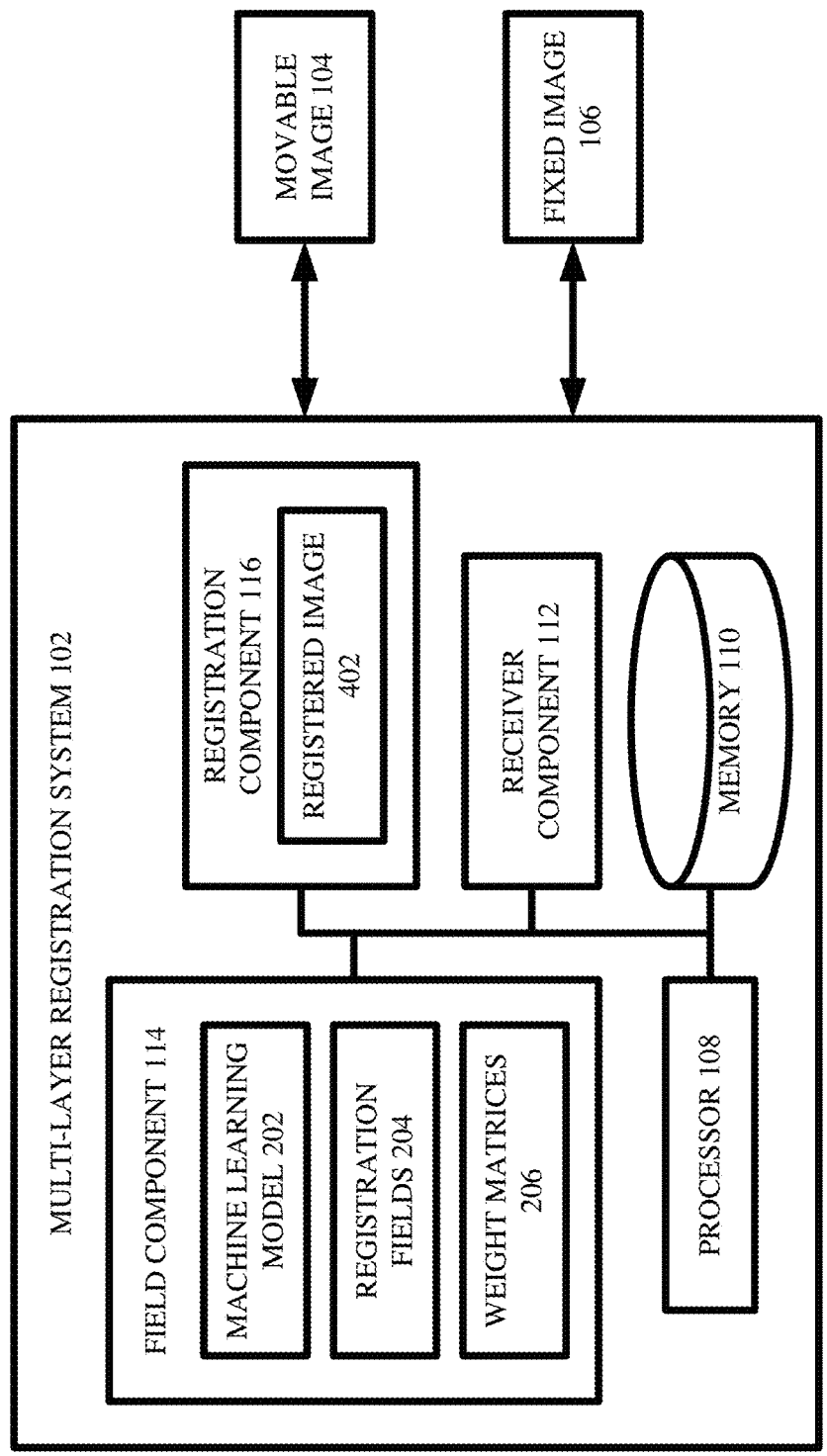
FIG. 4 illustrates a block diagram of an example, non-limiting system including a registered image that facilitates multi-layer image registration in accordance with one or more embodiments described herein.

FIG. 4 illustrates a block diagram of an example, non-limiting system 400 including a registered image that can facilitate multi-layer image registration in accordance with one or more embodiments described herein. As shown, the system 400 can, in some cases, comprise the same components as the system 200, and can further comprise a registered image 402.

In various embodiments, the registered image 402 can be considered as a shifted, transformed, and/or modified version of the movable image 104, where such shifted, transformed and/or modified version is aligned with the fixed image 106. In various aspects, the registration component 116 can electronically generate the registered image 402 based on the set of registration fields 204 and based on the set of weight matrices 206. This is explained more with respect to FIGS. 5-6.

Figure 5:
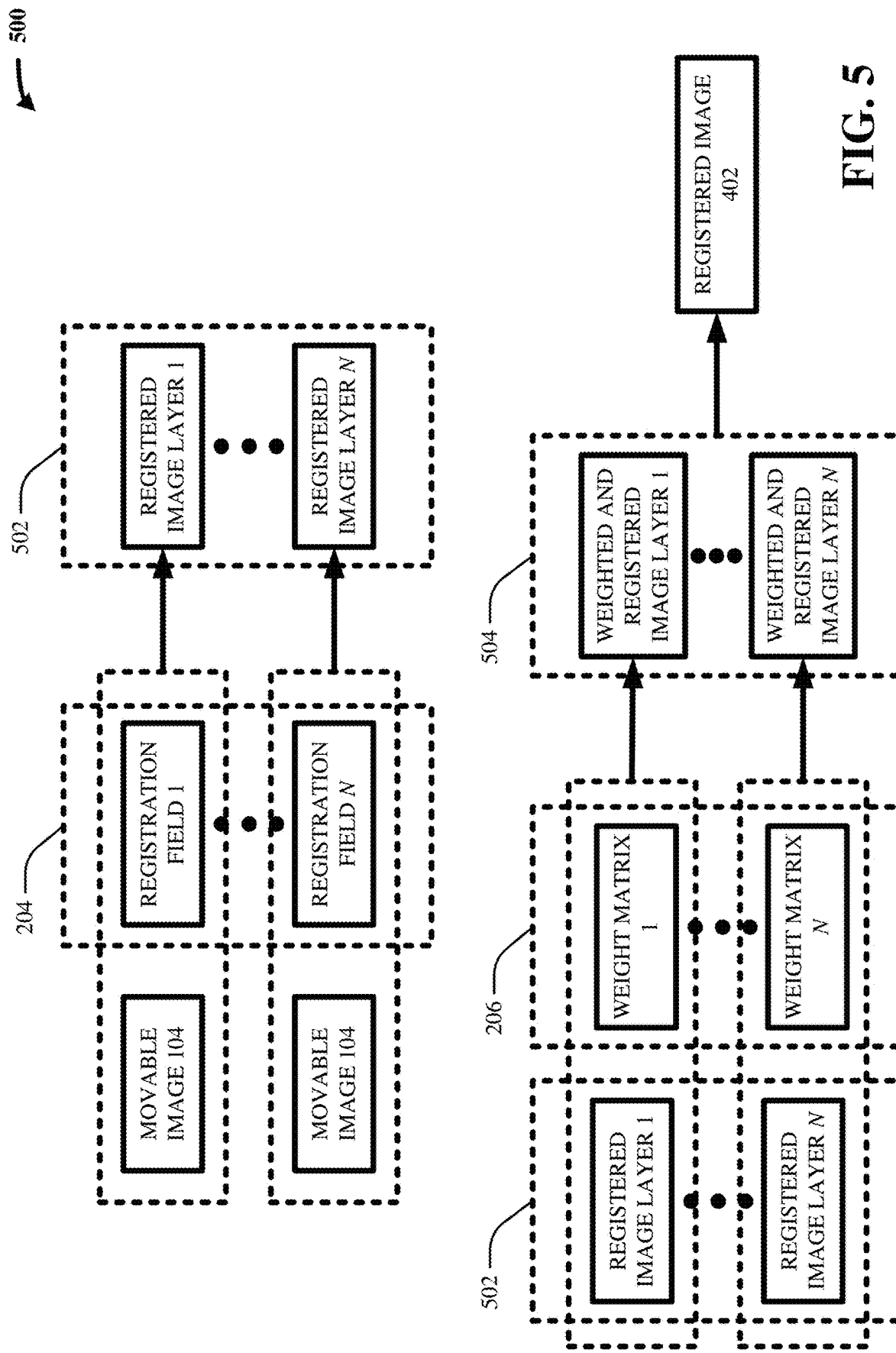
FIGS. 5-6 illustrate example, non-limiting block diagrams showing how a registered image can be generated based on a plurality of registration fields and a plurality of weight matrices in accordance with one or more embodiments described herein.
Figure 6:
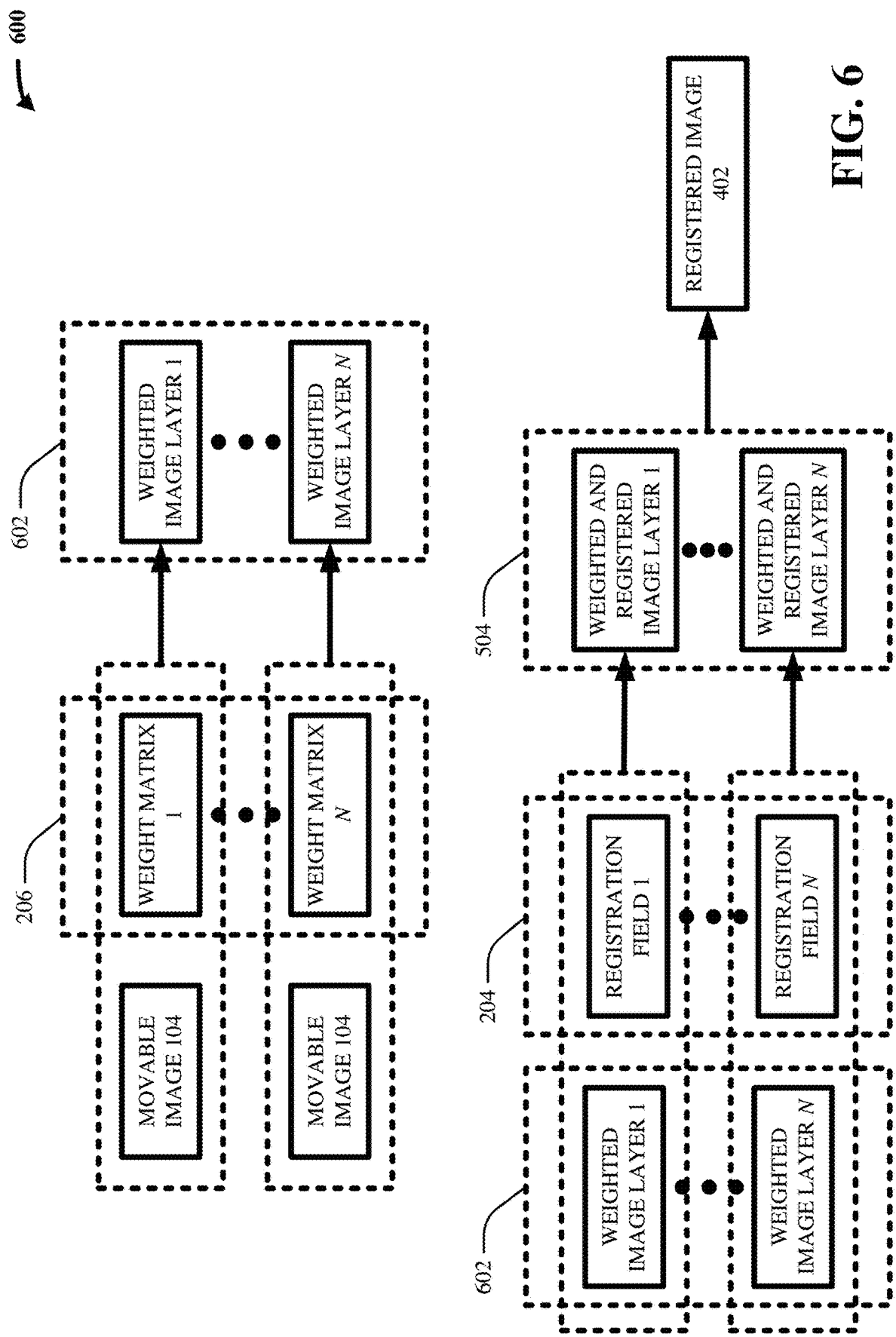

FIGS. 5-6 illustrates example, non-limiting block diagrams 500 and 600 showing how the registered image 402 can be generated based on the set of registration fields 204 and the set of weight matrices 206 in accordance with one or more embodiments described herein.

First, consider FIG. 5. As shown, in various aspects, the registration component 116 can electronically apply each of the set of registration fields 204 to the movable image 104, thereby yielding a set of registered image layers 502. For example, as explained above, the registration field 1 can be an s-by-t vector field that indicates shift vectors for the pixels of the movable image 104. Accordingly, in various instances, the registration component 116 can apply the registration field 1 to the movable image 104 (e.g., can shift the pixels of the movable image 104 according to the shift vectors indicated by the registration field 1), and the result can be a registered image layer 1. In various cases, the registered image layer 1 can be an s-by-t pixel array that can be considered as the two-dimensional image that is obtained when the pixels of the movable image 104 are shifted according to the registration field 1. As another example, as explained above, the registration field n can be an s-by-t vector field that indicates shift vectors for the pixels of the movable image 104. Accordingly, in various instances, the registration component 116 can apply the registration field n to the movable image 104 (e.g., can shift the pixels of the movable image 104 according to the shift vectors indicated by the registration field n), and the result can be a registered image layer n. In various cases, the registered image layer n can be an s-by-t pixel array that can be considered as the two-dimensional image that is obtained when the pixels of the movable image 104 are shifted according to the registration field n. In various aspects, the registered image layer 1 to the registered image layer n can collectively be considered as the set of registered image layers 502.

Furthermore, in various instances, the registration component 116 can electronically apply the set of weight matrices 206 to the set of registered image layers 502, thereby yielding a set of weighted and registered image layers 504. For example, as explained above, the weight matrix 1 can be an s-by-t matrix of scalars, with each scalar indicating a level of importance to be given to a respectively corresponding shift vector in the registration field 1. Accordingly, in various instances, the registration component 116 can multiply in element-wise fashion (e.g., as opposed to matrix multiplication fashion) the registered image layer 1 by the weight matrix 1, thereby yielding a weighted and registered image layer 1. In various cases, the weighted and registered image layer 1 can be an s-by-t pixel array that can be considered as the two-dimensional image that is obtained when the pixels of the registered image layer 1 are element-wise multiplied by the scalars of the weight matrix 1. As another example, the weight matrix n can be an s-by-t matrix of scalars, with each scalar indicating a level of importance to be given to a respectively corresponding shift vector in the registration field n. Accordingly, in various instances, the registration component 116 can multiply in element-wise fashion (e.g., as opposed to matrix multiplication fashion) the registered image layer n by the weight matrix n, thereby yielding a weighted and registered image layer n. In various cases, the weighted and registered image layer n can be an s-by-t pixel array that can be considered as the two-dimensional image that is obtained when the pixels of the registered image layer n are element-wise multiplied by the scalars of the weight matrix n. In various aspects, the weighted and registered image layer 1 to the weighted and registered image layer n can collectively be considered as the set of weighted and registered image layers 504.

Further still, in various aspects, the registration component 116 can electronically generate the registered image 402 based on the set of weighted and registered image layers 504. More specifically, the registration component 116 can sum together all of the set of weighted and registered image layers 504, and the result can be the registered image 402.

Next, consider FIG. 6 which shows an alternative technique as that depicted in FIG. 5. As shown, in various aspects, the registration component 116 can electronically apply each of the set of weight matrices 206 to the movable image 104, thereby yielding a set of weighted image layers 602. For example, as explained above, the weight matrix 1 can be an s-by-t matrix of scalars, with each scalar indicating a level of importance to be given to a respectively corresponding shift vector in the registration field 1. In various instances, the registration component 116 can apply the weight matrix 1 to the movable image 104 (e.g., can perform element-wise multiplication between the weight matrix 1 and the movable image 104), and the result can be a weighted image layer 1. In various cases, the weighted image layer 1 can be an s-by-t pixel array that can be considered as the two-dimensional image that is obtained when the movable image 104 and the weight matrix 1 are multiplied together in element-wise fashion (e.g., as opposed to matrix multiplication fashion). As another example, as mentioned above, the weight matrix n can be an s-by-t matrix of scalars, with each scalar indicating a level of importance to be given to a respectively corresponding shift vector in the registration field n. In various instances, the registration component 116 can apply the weight matrix n to the movable image 104 (e.g., can perform element-wise multiplication between the weight matrix n and the movable image 104), and the result can be a weighted image layer n. In various cases, the weighted image layer n can be an s-by-t pixel array that can be considered as the two-dimensional image that is obtained when the movable image 104 and the weight matrix n are multiplied together in element-wise fashion (e.g., as opposed to matrix multiplication fashion). In various aspects, the weighted image layer 1 to the weighted image layer n can collectively be considered as the set of weighted image layers 602.

Furthermore, in various instances, the registration component 116 can electronically apply the set of registration fields 204 to the set of weighted image layers 602, thereby yielding the set of weighted and registered image layers 504. For example, as explained above, the registration field 1 can be an s-by-t vector field that indicates shift vectors for each pixel of the movable image 104. Accordingly, in various instances, the registration component 116 can apply the registration field 1 to the weighted image layer 1 (e.g., can shift the pixels of the weighted image layer 1 according to the shift vectors indicated by the registration field 1), and the result can be the weighted and registered image layer 1. In various cases, the weighted and registered image layer 1 can be an s-by-t pixel array that can be considered as the two-dimensional image that is obtained when the pixels of the weighted image layer 1 are shifted according to the registration field 1. As another example, as explained above, the registration field n can be an s-by-t vector field that indicates shift vectors for each pixel of the movable image 104. Accordingly, in various instances, the registration component 116 can apply the registration field n to the weighted image layer n (e.g., can shift the pixels of the weighted image layer n according to the shift vectors indicated by the registration field n), and the result can be the weighted and registered image layer n. In various cases, the weighted and registered image layer n can be an s-by-t pixel array that can be considered as the two-dimensional image that is obtained when the pixels of the weighted image layer n are shifted according to the registration field n.

In various instances, as mentioned above, the registration component 116 can then electronically generate the registered image 402 based on the set of weighted and registered image layers 504 (e.g., by summing together all of the set of weighted and registered image layers 504).

Although not shown in FIGS. 5-6, the registration component 116 can, in some alternative cases, electronically store, maintain, control, and/or otherwise access a registration machine learning model. In various aspects, the registration machine learning model can exhibit any suitable artificial intelligence architecture as desired (e.g., can include any suitable number of layers, any suitable numbers of neurons in various layers, any suitable activation functions in various neurons, any suitable interneuron connections). In any case, the registration machine learning model can be configured to receive as input all of the set of registration fields 204 and all of the set of weight matrices 206, and can be configured to produce as output the registered image 402. For instance, the set of registration fields 204 and the set of weight matrices 206 can be concatenated together, an input layer of the registration machine learning model can be receive such concatenation, such concatenation can complete a forward pass through one or more hidden layers of the registration machine learning model, and an output layer of the registration machine learning model can compute the registered image 402 based on activations provided by the one or more hidden layers. As those having ordinary skill in the art will appreciate, the registration machine learning model can be trained in any suitable fashion (e.g., supervised training, unsupervised training, reinforcement learning).

In any case, the registration component 116 can generate the registered image 402 based on the set of registration fields 204 and the set of weight matrices 206. Although not explicitly shown in the figures, the multi-layer registration system 102 can, in some embodiments, comprise an execution component that can take and/or initiate any suitable electronic action based on the registered image 402. For example, in some cases, the execution component can electronically transmit the registered image 402 to any suitable computing device (not shown). As another example, in some cases, the execution component can electronically render the registered image 402 and/or the fixed image 106 on any suitable computer screen, computer display, and/or computer monitor (not shown).

As described above, the machine learning model 202 can be configured to receive as input the movable image 104 and the fixed image 106, and to produce as output the set of registration fields 204 and the set of weight matrices 206. In order to facilitate such functionality, the machine learning model 202 should first be trained. In various cases, the machine learning model 202 can be trained in an unsupervised fashion, as described with respect to FIGS. 7-9. In various other cases, the machine learning model 202 can be trained in a supervised fashion, as described with respect to FIGS. 10-12.

Figure 7:
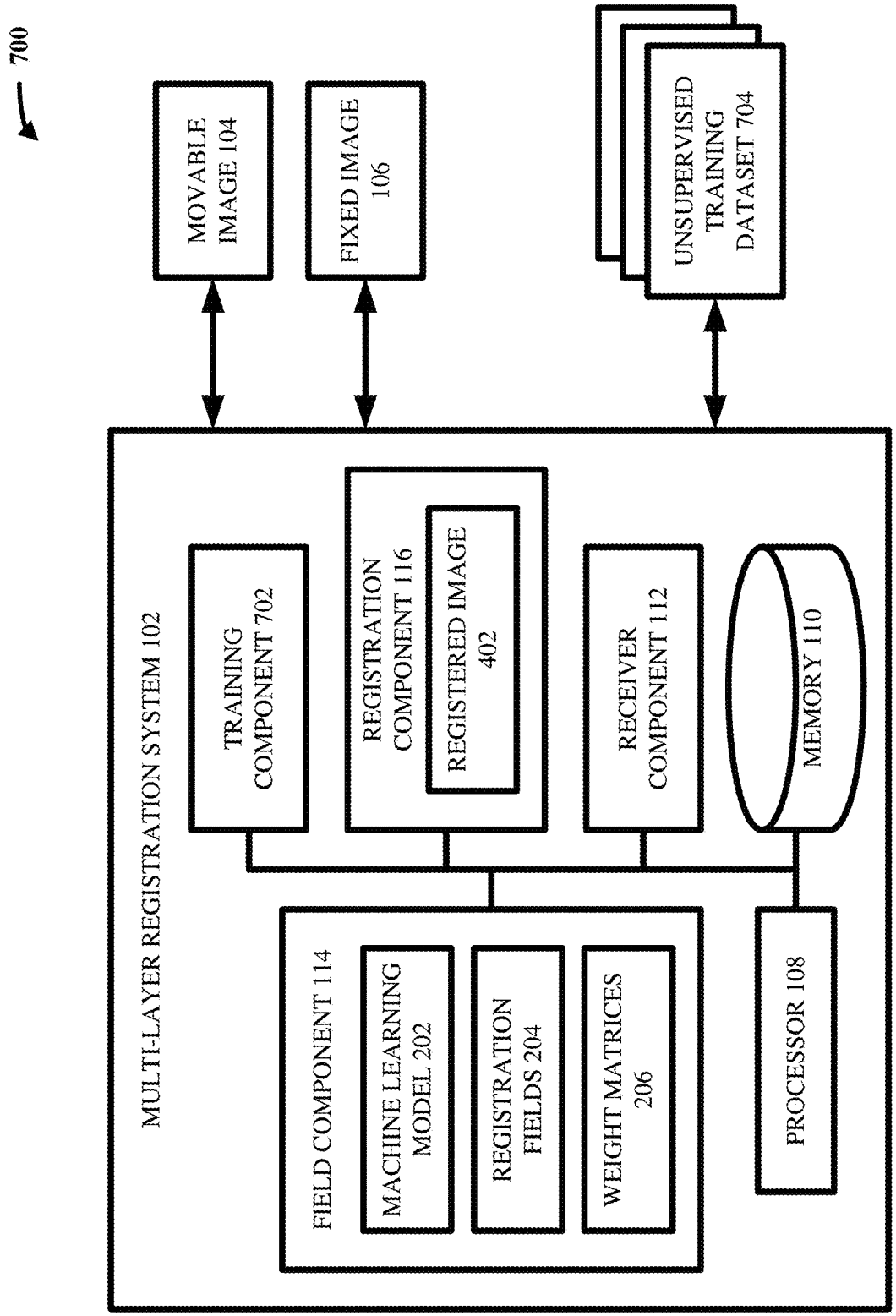
FIG. 7 illustrates a block diagram of an example, non-limiting system including a training component and an unsupervised training dataset that facilitates multi-layer image registration in accordance with one or more embodiments described herein.

FIG. 7 illustrates a block diagram of an example, non-limiting system 700 including a training component and an unsupervised training dataset that can facilitate multi-layer image registration in accordance with one or more embodiments described herein. As shown, the system 700 can, in some cases, comprise the same components as the system 400, and can further comprise a training component 702 and/or an unsupervised training dataset 704.

Figure 8:
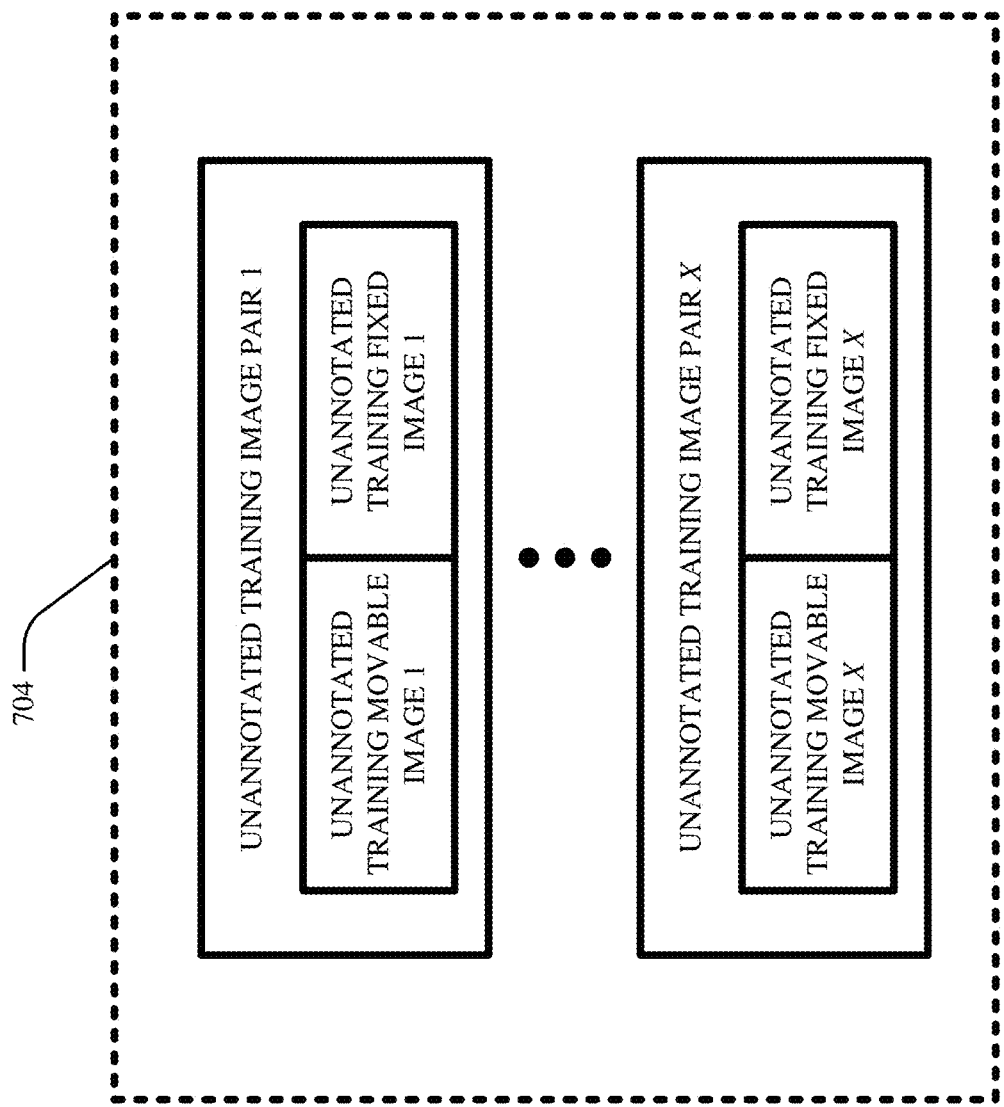
FIG. 8 illustrates an example, non-limiting block diagram of an unsupervised training dataset in accordance with one or more embodiments described herein.
Figure 9:
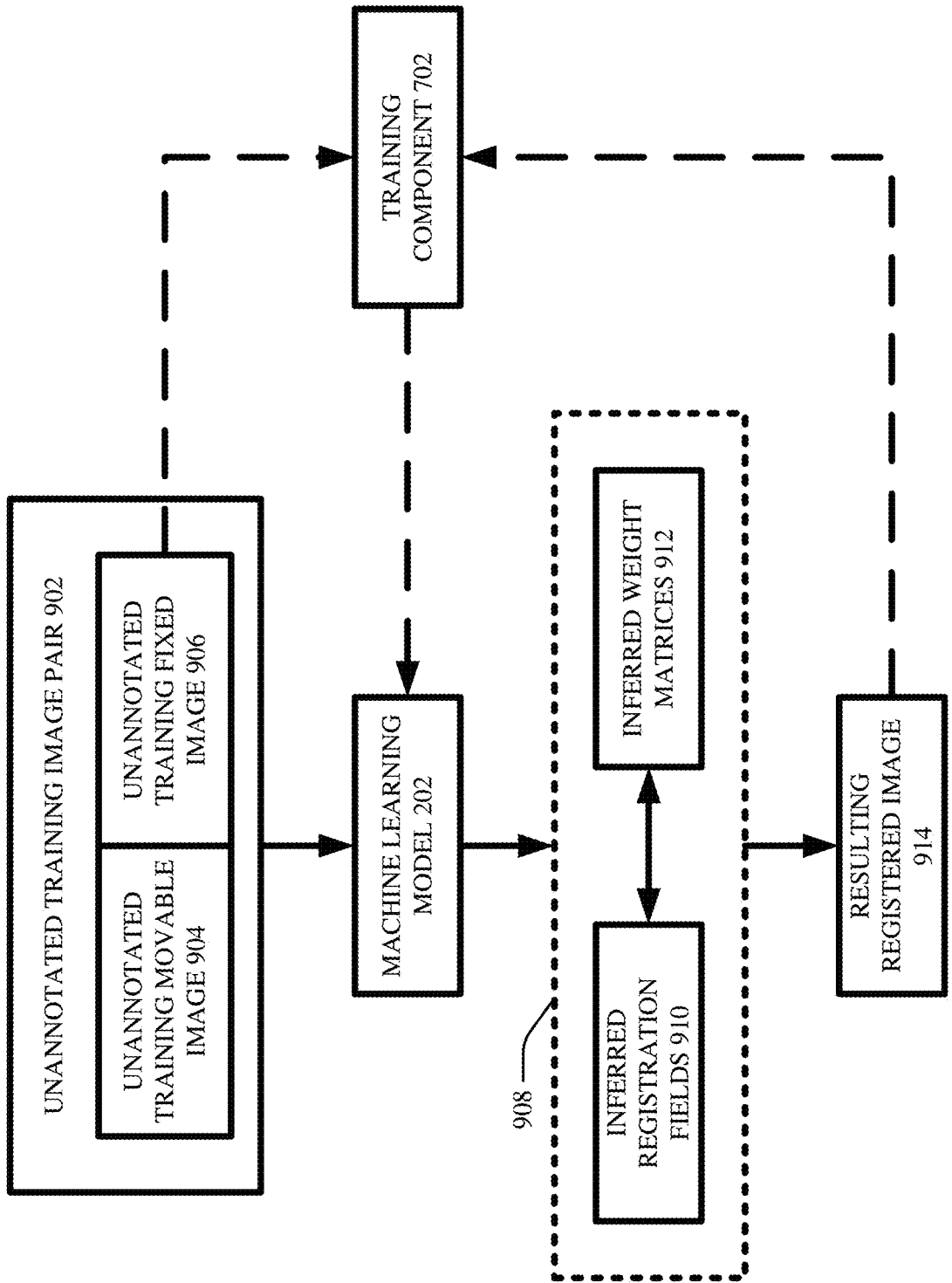
FIG. 9 illustrates an example, non-limiting block diagram showing how a machine learning model can be trained on an unsupervised training dataset in accordance with one or more embodiments described herein.

In various embodiments, the receiver component 112 can electronically receive and/or access the unsupervised training dataset 704, and the training component 702 can electronically train the machine learning model 202 on the unsupervised training dataset 704, as described with respect to FIGS. 8-9.

FIG. 8 illustrates an example, non-limiting block diagram 800 of an unsupervised training dataset in accordance with one or more embodiments described herein. In other words, FIG. 8 depicts a non-limiting example embodiment of the unsupervised training dataset 704.

In various aspects, the unsupervised training dataset 704 can include any suitable number of unannotated training image pairs. For instance, as shown, the unsupervised training dataset 704 can include x image pairs for any suitable positive integer x: an unannotated training image pair 1 to an unannotated training image pair x. In various instances, each unannotated training image pair can include a movable image having the same size (e.g., s-by-t pixel array) as the movable image 104 and a fixed image having the same size as the fixed image 106. For example, the unannotated training image pair 1 can include an unannotated training movable image 1 and an unannotated training fixed image 1. In various aspects, the unannotated training movable image 1 can be considered as an image that is to be shifted and/or translated so as to be aligned/registered with the unannotated training fixed image 1 (e.g., the unannotated training movable image 1 and the unannotated training fixed image 1 can be considered as depicting the same features and/or anatomical structures as each other with different positions and/or orientations). In various instances, the unannotated training image pair 1 can be considered as "unannotated" since the precise pixel-wise shifts and/or transformations needed to register/align the unannotated training movable image 1 with the unannotated training fixed image 1 can be unknown. As another example, the unannotated training image pair x can include an unannotated training movable image x and an unannotated training fixed image x. In various cases, the unannotated training movable image x can be considered as an image that is to be shifted and/or translated so as to be aligned/registered with the unannotated training fixed image x (e.g., the unannotated training movable image x and the unannotated training fixed image x can be considered as depicting the same features and/or anatomical structures as each other with different positions and/or orientations). Just as above, the unannotated training image pair x can be considered as "unannotated" since the precise pixel-wise shifts and/or transformations needed to register/align the unannotated training movable image x with the unannotated training fixed image x can be unknown.

FIG. 9 illustrates an example, non-limiting block diagram 900 showing how the machine learning model 202 can be trained on the unsupervised training dataset 704 in accordance with one or more embodiments described herein.

In various embodiments, the internal parameters (e.g., weights, biases) of the machine learning model 202 can be randomly initialized. In various aspects, the training component 702 can electronically select an unannotated training image pair 902 from the unsupervised training dataset 704. As shown, the unannotated training image pair 902 can include an unannotated training movable image 904 and an unannotated training fixed image 906. In various instances, the training component 702 can electronically feed the unannotated training image pair 902 as input to the machine learning model 202, and this can cause the machine learning model 202 to produce some output 908. More specifically, the unannotated training movable image 904 and the unannotated training fixed image 906 can be concatenated together, an input layer of the machine learning model 202 can receive such concatenation, such concatenation can complete a forward pass through one or more hidden layers of the machine learning model 202, and an output layer of the machine learning model 202 can compute the output 908 based on activations provided by the one or more hidden layers.

As shown, the output 908 can include a set of inferred registration fields 910 and a set of inferred weight matrices 912 that can respectively correspond to the set of inferred registration fields 910. In various cases, the set of inferred registration fields 910 can include n registration fields (e.g., just like the set of registration fields 204), and each of such inferred registration fields can be an s-by-t vector field. In various aspects, the set of inferred weight matrices 912 can include n weight matrices (e.g., just like the set of weight matrices 206), and each of such inferred weight matrices can be an s-by-t matrix of scalars. Accordingly, the output 908 can be considered as representing the registration fields and weight matrices that the machine learning model 202 believes are needed to register/align the unannotated training movable image 904 with the unannotated training fixed image 906. Note that, if the machine learning model 202 has so far undergone no and/or little training, the output 908 can be highly inaccurate (e.g., the inferred registration fields 910 and the inferred weight matrices 912 can be very different from those registration fields and those weight matrices which would successfully and/or accurately allow the unannotated training movable image 904 to be registered/aligned with the unannotated training fixed image 906).

In various aspects, as shown, the registration component 116 can electronically compute (e.g., as described with respect to FIGS. 5-6) a resulting registered image 914 based on the output 908. In other words, the registration component 116 can apply the set of inferred registration fields 910 and/or the set of inferred weight matrices 912 to the unannotated training movable image 904, and the result can be the resulting registered image 914. That is, the resulting registered image 914 can be considered as representing what the machine learning model 202 believes to be the shifted/transformed version of the unannotated training movable image 904 that is registered/aligned with the unannotated training fixed image 906.

In various instances, because the unannotated training movable image 904 and the unannotated training fixed image 906 can depict the same features (e.g., same anatomical structures of the same patient) as each other with different feature positions and/or feature orientations, it can be desired for the resulting registered image 914 to look very much like the unannotated training fixed image 906. In other words, if the resulting registered image 914 is identical to (and/or otherwise within any suitable threshold margin of) the unannotated training fixed image 906, then it can be inferred that the output 908 was accurate. On the other hand, if the resulting registered image 914 is very different from (and/or otherwise not within any suitable threshold margin of) the unannotated training fixed image 906, then it can be inferred that the output 908 was not accurate. Accordingly, in various aspects, the training component 702 can compute an error/loss (e.g., cross-entropy, Euclidean distance) between the resulting registered image 914 and the unannotated training fixed image 906, and the training component 702 can update, via backpropagation, the internal parameters of the machine learning model 202 based on such error/loss.

In various aspects, the training component 702 can repeat the above training procedure for each unannotated training image pair in the unsupervised training dataset 704, with the ultimate result being that the internal parameters of the machine learning model 202 become iteratively optimized for accurately inferring sets of registration fields and sets of weight matrices based on inputted image pairs. Those having ordinary skill in the art will appreciate that any suitable training batch sizes, any suitable training termination criteria, and/or any suitable error/loss functions can be implemented as desired.

Figure 10:
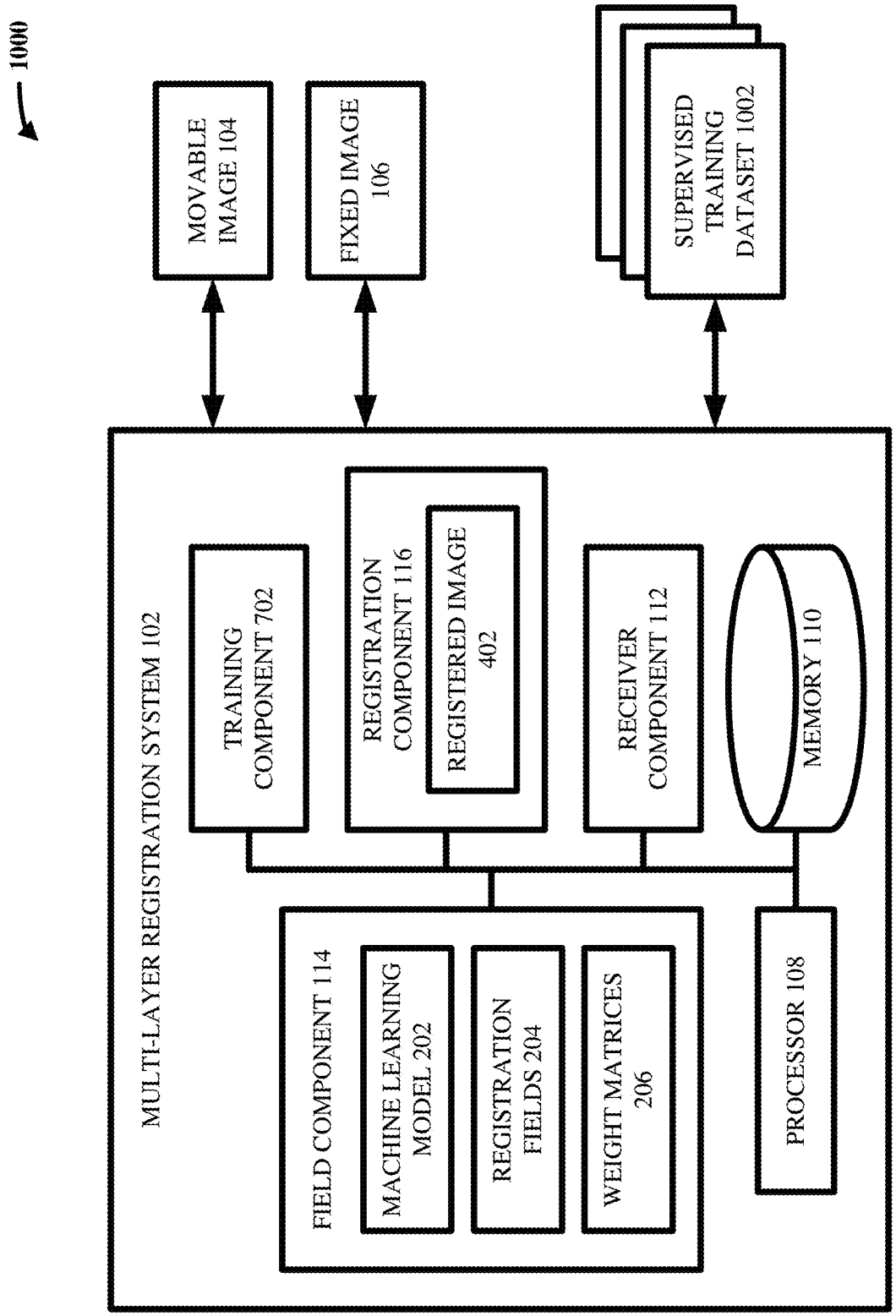
FIG. 10 illustrates a block diagram of an example, non-limiting system including a supervised training dataset that facilitates multi-layer image registration in accordance with one or more embodiments described herein.

FIG. 10 illustrates a block diagram of an example, non-limiting system 1000 including a supervised training dataset that can facilitate multi-layer image registration in accordance with one or more embodiments described herein. As shown, the system 1000 can, in some cases, comprise the same components as the system 700, and can further comprise a supervised training dataset 1002.

Figure 11:
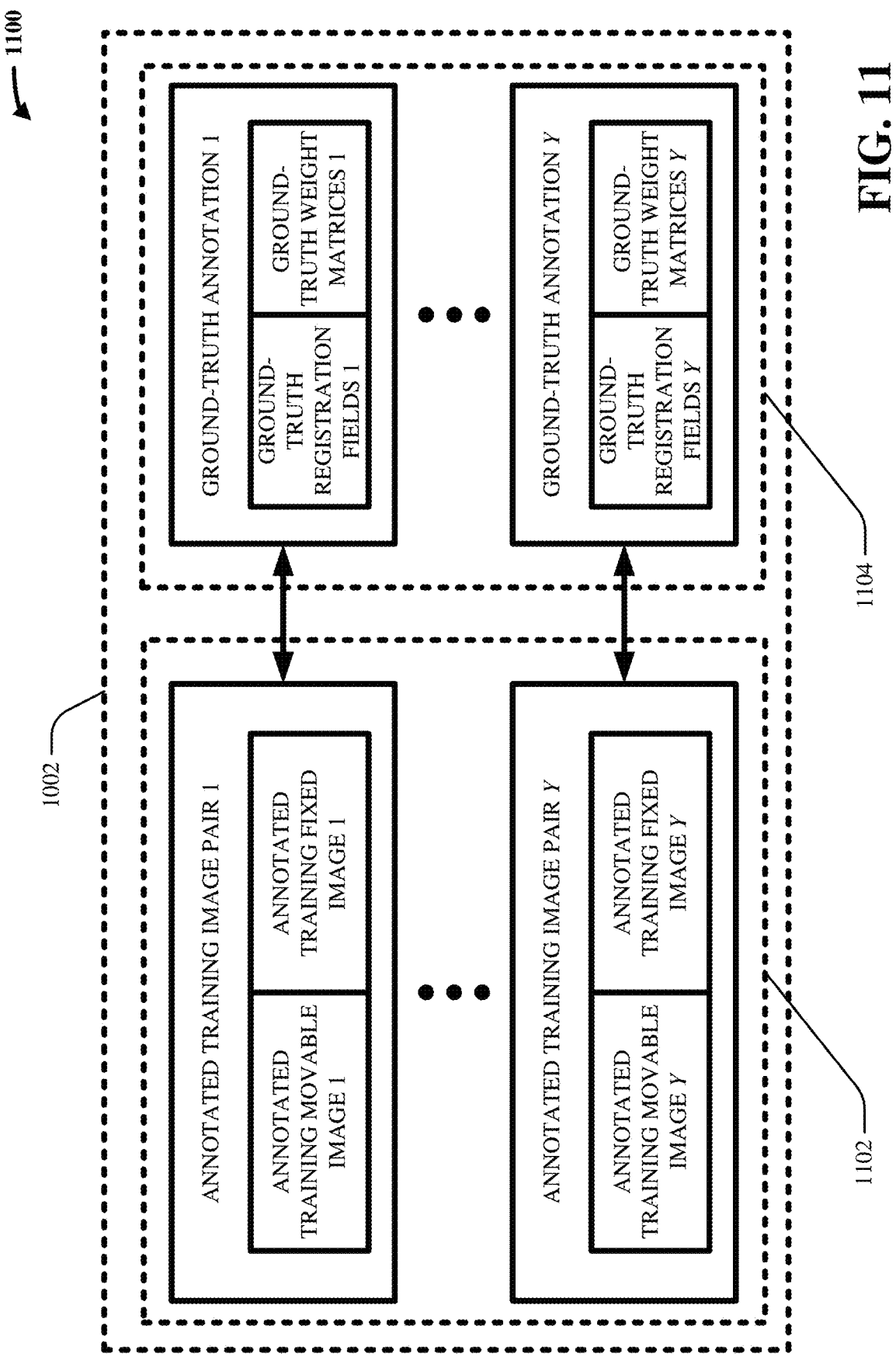
FIG. 11 illustrates an example, non-limiting block diagram of a supervised training dataset in accordance with one or more embodiments described herein.
Figure 12:
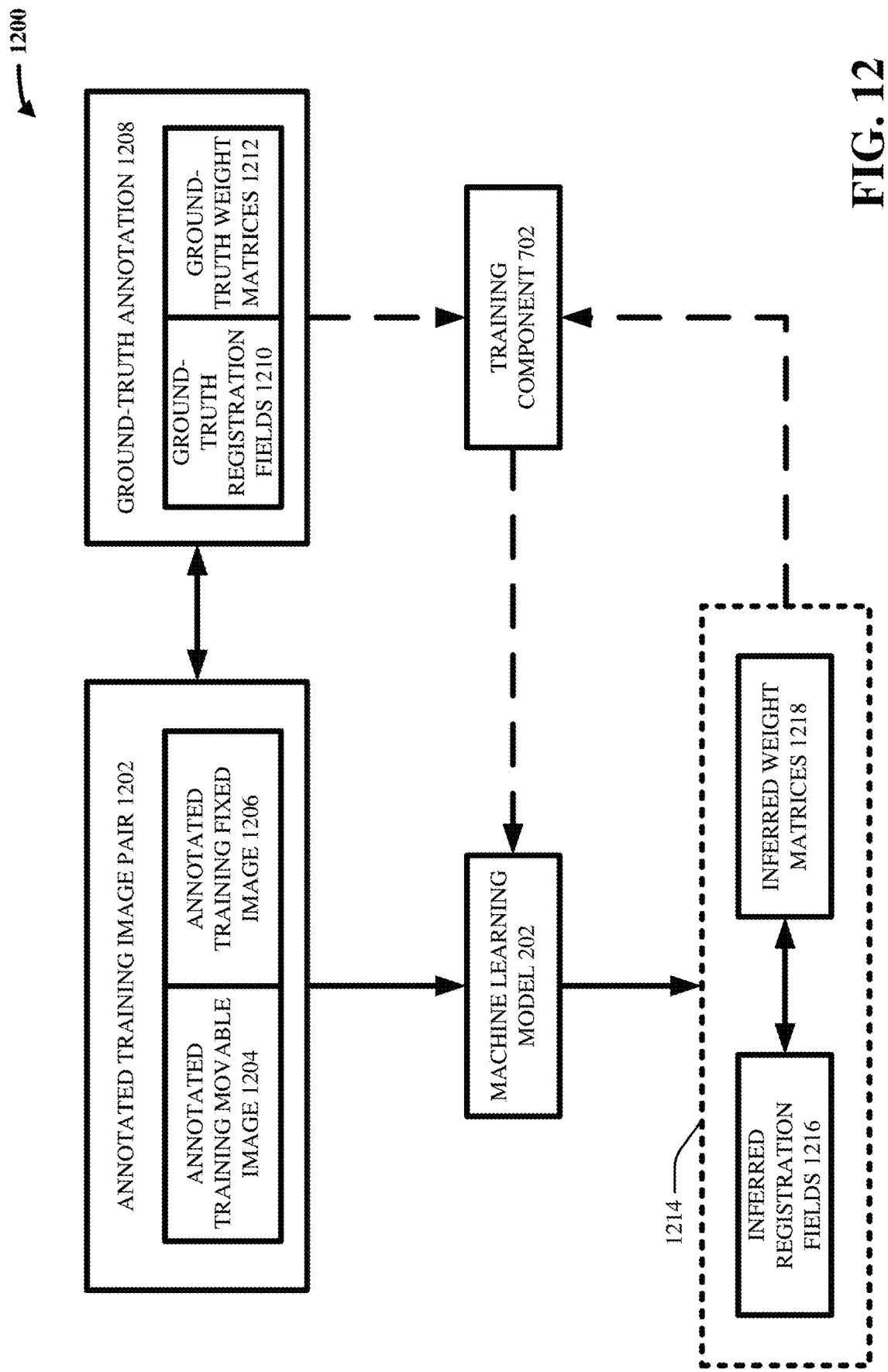
FIG. 12 illustrates an example, non-limiting block diagram showing how a machine learning model can be trained on a supervised training dataset in accordance with one or more embodiments described herein.

In various embodiments, the receiver component 112 can electronically receive and/or access the supervised training dataset 1002, and the training component 702 can electronically train the machine learning model 202 on the supervised training dataset 1002, as described with respect to FIGS. 11-12.

FIG. 11 illustrates an example, non-limiting block diagram 1100 of a supervised training dataset in accordance with one or more embodiments described herein. In other words, FIG. 11 shows a non-limiting example embodiment of the supervised training dataset 1002.

In various embodiments, the supervised training dataset 1002 can include a set of annotated training image pairs 1102 and a set of ground-truth annotations 1104 that respectively correspond to the set of annotated training image pairs 1102.

In various aspects, the set of annotated training image pairs 1102 can include y image pairs for any suitable positive integer y: an annotated training image pair 1 to an annotated training image pair y. In various instances, each annotated training image pair can include a movable image that has the same size as the movable image 104 (e.g., s-by-t pixel array) and a fixed image that has the same size as the fixed image 106. For example, the annotated training image pair 1 can include an annotated training movable image 1 and an annotated training fixed image 1. In various cases, the annotated training movable image 1 can be considered as an image that is to be shifted and/or translated so as to be aligned/registered with the annotated training fixed image 1 (e.g., the annotated training movable image 1 and the annotated training fixed image 1 can be considered as depicting the same features and/or anatomical structures as each other with different positions and/or orientations). As another example, the annotated training image pair y can include an annotated training movable image y and an annotated training fixed image y. In various cases, the annotated training movable image y can be considered as an image that is to be shifted and/or translated so as to be aligned/registered with the annotated training fixed image y (e.g., the annotated training movable image y and the annotated training fixed image y can be considered as depicting the same features and/or anatomical structures as each other with different positions and/or orientations).

In various aspects, the set of ground-truth annotations 1104 can respectively correspond to the set of annotated training image pairs 1102. That is, the set of ground-truth annotations 1104 can include y annotations: a ground-truth annotation 1 to a ground-truth annotation y. In various instances, each ground-truth annotation can include a set of ground-truth registration fields and a set of ground-truth weight matrices that respectively correspond to the set of ground-truth registration fields. For example, the ground-truth annotation 1 can include a set of ground-truth registration fields 1 and a set of ground-truth weight matrices 1. In various aspects, the set of ground-truth registration fields can include n registration fields (e.g., just like the set of registration fields 204), with each ground-truth registration field being an s-by-t vector field. Similarly, in various instances, the set of ground-truth weight matrices 1 can include n weight matrices (e.g., just like the set of weigh matrices 206), with each ground-truth weight matrix being an s-by-t matrix of scalar weights. Accordingly, in various cases, the set of ground-truth registration fields 1 and the set of ground-truth weight matrices 1 can be considered as representing the known, correct, and/or accurate shift vectors and weights that are needed to properly register/align the annotated training movable image 1 with the annotated training fixed image 1. As another example, the ground-truth annotation y can include a set of ground-truth registration fields y and a set of ground-truth weight matrices y. In various aspects, the set of ground-truth registration fields y can include n registration fields (e.g., just like the set of registration fields 204), with each ground-truth registration field being an s-by-t vector field. Similarly, in various instances, the set of ground-truth weight matrices y can include n weight matrices (e.g., just like the set of weigh matrices 206), with each ground-truth weight matrix being an s-by-t matrix of scalar weights. Accordingly, in various cases, the set of ground-truth registration fields y and the set of ground-truth weight matrices y can be considered as representing the known, correct, and/or accurate shift vectors and weights that are needed to properly register/align the annotated training movable image y with the annotated training fixed image y.

As those having ordinary skill in the art will appreciate, the set of ground-truth annotations 1104 can be obtained in any suitable fashion. As a non-limiting example, the set of ground-truth annotations 1104 can be manually generated by subject matter experts that manually review the set of annotated training image pairs 1102. As another non-limiting example, the set of ground-truth annotations 1104 can be generated automatically by applying one or more simulated movements and/or transformations to the set of annotated training image pairs 1102 (e.g., heartbeats can be simulated by expanding and/or shrinking a depicted heart; breathing can be simulated by expanding and/or shrinking depicted lungs). For instance, when given a training movable image, a corresponding training fixed image can be generated for that training movable image by applying a known simulated movement to the training movable image, and a ground-truth annotation for that movable-image-and-fixed-image pair can be created based on the known simulated movement.

FIG. 12 illustrates an example, non-limiting block diagram 1200 showing how the machine learning model 202 can be trained on the supervised training dataset 1002 in accordance with one or more embodiments described herein.

In various embodiments, the internal parameters (e.g., weights, biases) of the machine learning model 202 can be randomly initialized. In various aspects, the training component 702 can electronically select an annotated training image pair 1202 and a corresponding ground-truth annotation 1208 from the supervised training dataset 1002. As shown, the annotated training image pair 1202 can include an annotated training movable image 1204 and an annotated training fixed image 1206. As also shown, the ground-truth annotation 1208 can include a set of ground-truth registration fields 1210 and a set of ground-truth weight matrices 1212.

In various instances, the training component 702 can electronically feed the annotated training image pair 1202 as input to the machine learning model 202, and this can cause the machine learning model 202 to produce some output 1214. More specifically, the annotated training movable image 1204 and the annotated training fixed image 1206 can be concatenated together, an input layer of the machine learning model 202 can receive such concatenation, such concatenation can complete a forward pass through one or more hidden layers of the machine learning model 202, and an output layer of the machine learning model 202 can compute the output 1214 based on activations provided by the one or more hidden layers. As shown, the output 1214 can include a set of inferred registration fields 1216 and a set of inferred weight matrices 1218 that can respectively correspond to the set of inferred registration fields 1216. In various cases, the set of inferred registration fields 1216 can include n registration fields (e.g., just like the set of registration fields 204), and each of such inferred registration fields can be an s-by-t vector field. In various aspects, the set of inferred weight matrices 1218 can include n weight matrices (e.g., just like the set of weight matrices 206), and each of such inferred weight matrices can be an s-by-t matrix of scalars. Accordingly, the output 1214 can be considered as representing the registration fields and weight matrices that the machine learning model 202 believes are needed to register/align the annotated training movable image 1204 with the annotated training fixed image 1206. In contrast, the ground-truth annotation 1208 can be considered as representing the registration fields and weight matrices that are known to accurately register/align the annotated training movable image 1204 with the annotated training fixed image 1206. Note that, if the machine learning model 202 has so far undergone no and/or little training, the output 1214 can be highly inaccurate (e.g., the set of inferred registration fields 1216 can be very different from the set of ground-truth registration fields 1210, and/or the set of inferred weight matrices 1218 can be very different from the set of ground-truth weight matrices 1212). In any case, as shown, the training component 702 can compute an error/loss (e.g., cross-entropy, Euclidean distance) between the output 1214 and the ground-truth annotation 1208 (e.g., the training component 702 can compute errors/losses between the set of inferred registration fields 1216 and the set of ground-truth registration fields 1210; and the training component 702 can compute error/losses between the set of inferred weight matrices 1218 and the set of ground-truth weight matrices 1212). Accordingly, the training component 702 can update, via backpropagation, the internal parameters of the machine learning model 202 based on such error/loss.

In various aspects, the training component 702 can repeat the above training procedure for each annotated training image pair in the supervised training dataset 1002, with the ultimate result being that the internal parameters of the machine learning model 202 become iteratively optimized for accurately inferring sets of registration fields and sets of weight matrices based on inputted image pairs. Those having ordinary skill in the art will appreciate that any suitable training batch sizes, any suitable training termination criteria, and/or any suitable error/loss functions can be implemented as desired.

FIGS. 13-20 illustrate example, non-limiting images 1200, 1300, 1400, 1500, 1600, 1700, 1800, 1900, and 2000 associated with various embodiments described herein. In other words, FIGS. 13-20 show how various embodiments described herein can eliminate distortions and/or artefacts that normally accompany single-layer image registration.

In various aspects, FIG. 13 illustrates an image 1302 that was generated via a low-dose and/or low-exposure-time X-ray of a patient's chest cavity, and an image 1304 that was generated via a high-dose and/or high-exposure-time X-ray of the patient's chest cavity. Those having ordinary skill in the art will appreciate that the image 1302 is not yet registered/aligned with the image 1304.

In various instances, FIG. 14 illustrates an image 1402 and an image 1404. In various aspects, the image 1402 and the image 1404 can be considered as the results obtained when single-layer registration is applied to the image 1302 and the image 1304, respectively.

In various cases, FIG. 15 illustrates an image 1502 and an image 1504. In various aspects, the image 1502 can be considered as the result obtained when soft-tissue decomposition is applied to the image 1402. In various instances, the image 1504 can be considered as the result obtained when bone-tissue decomposition is applied to the image 1404. Those having ordinary skill in the art will appreciate that the image 1502 visually depicts various bone-related artefacts and/or distortions (e.g., shadows from ribs) and that the image 1504 visually depicts various soft-tissue-related artefacts and/or distortions (e.g., heart edge artefacts). In various aspects, FIG. 16 illustrates zoomed-in views of such artefacts and/or distortions. More specifically, an image 1602 illustrates a zoomed view of rib artefacts in the image 1502, and an image 1604 illustrates a zoomed view of heart artefacts in the image 1504. In various aspects, such artefacts can be due to and/or otherwise exacerbated by the application of single-layer image registration to the images 1302 and 1304.

Figure 17:
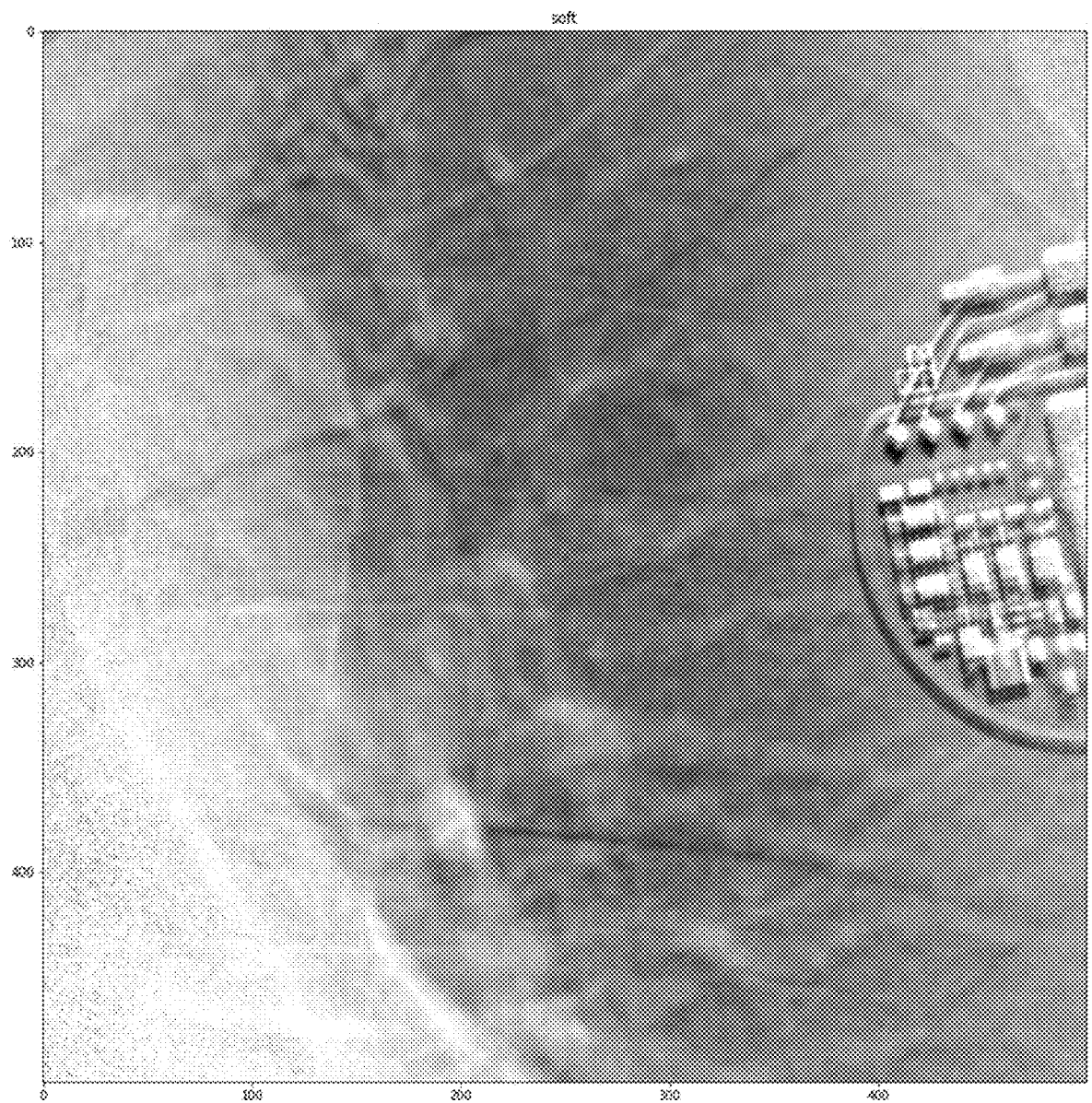
Figure 18:
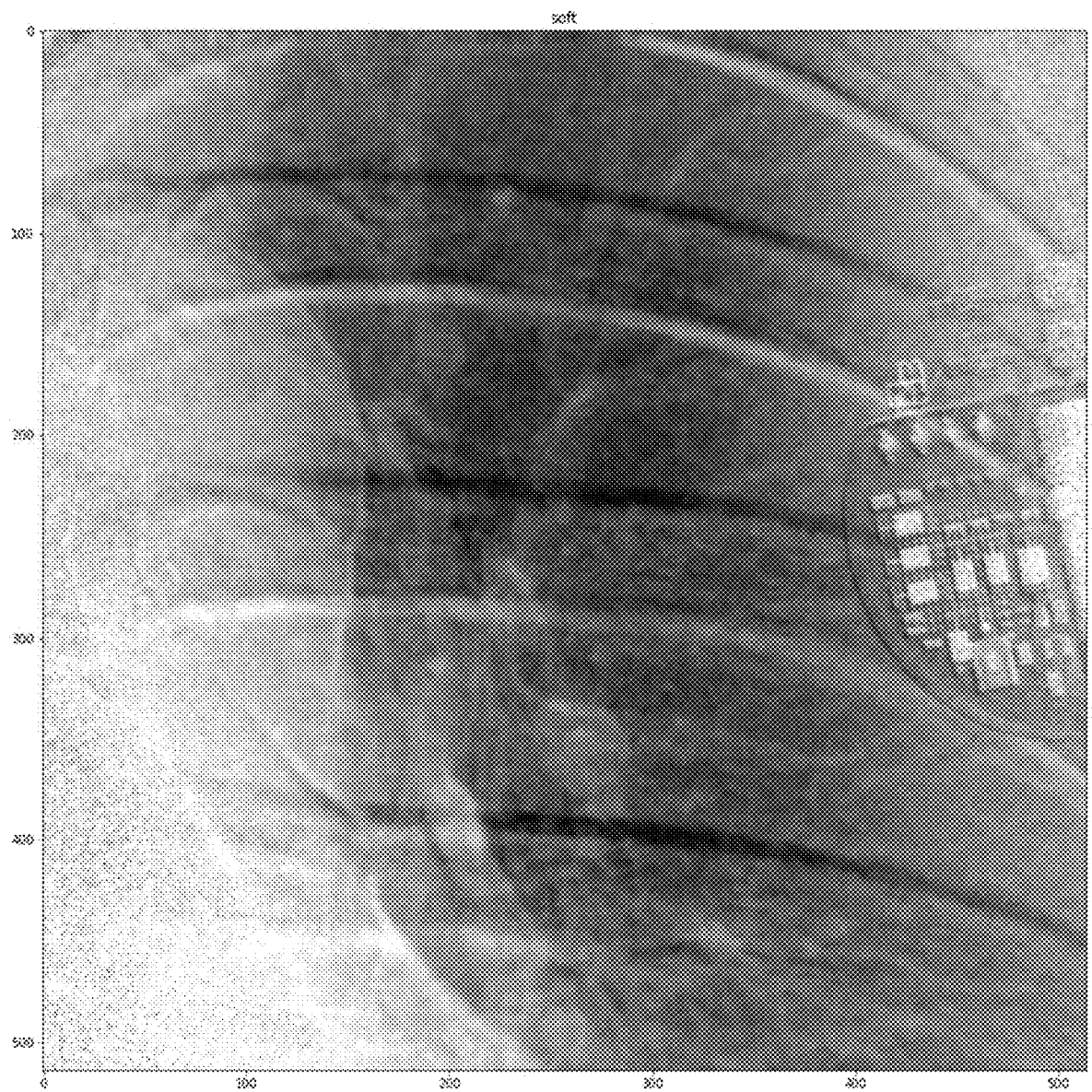
Figure 19:
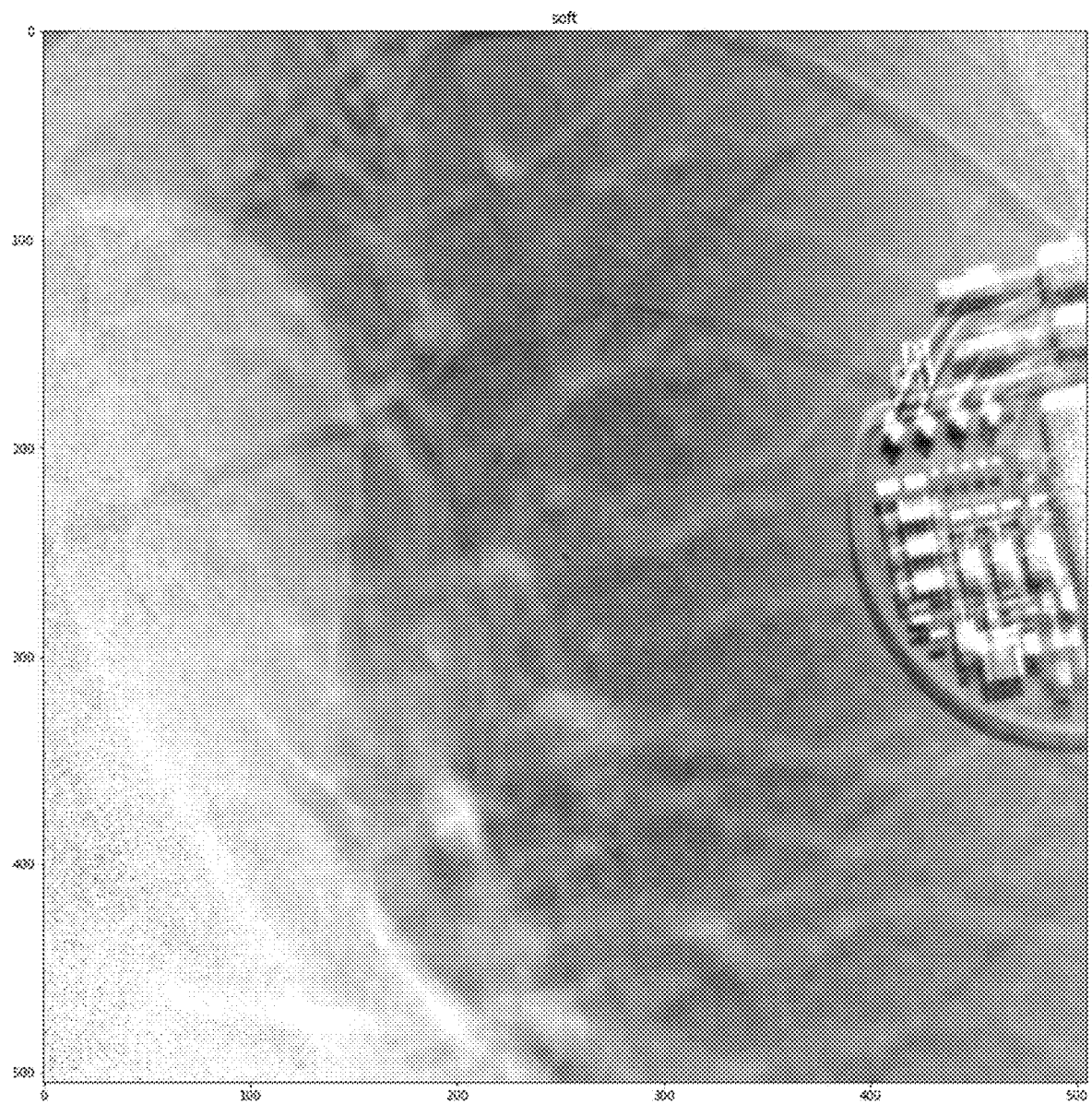

In various aspects, FIGS. 17-19 show additional zoomed-in views of various artefacts that can be caused by single-layer image registration. For example, the X-rays depicted in FIGS. 17-19 are of a patient that has a pacemaker. As shown, FIG. 17 depicts an original X-ray 1702 of the patient's chest cavity. As can be seen, the original X-ray 1702 includes both artefacts from lung-tissue and bone tissue. In various instances, FIG. 18 depicts a registered X-ray 1802 in which lung-tissue has been properly registered via single-layer image registration. As can be seen, however, bone-tissue in the registered X-ray 1802 is not properly aligned, which can result in various bone-related artefacts (e.g., shadows, edges). In various cases, FIG. 19 depicts a registered X-ray 1902 in which bone-tissue has been properly registered via single-layer image registration. As can be seen, however, lung-tissue in the registered X-ray 1902 is not properly aligned, which can result in various lung-related artefacts (e.g., shadows, edges). FIGS. 17-19 help to show that single-layer image registration is simply not able to handle contradictory movements of different types of tissue. In other words, the bone tissue and the lung tissue in FIGS. 17-19 move in different directions during X-ray scanning due to the patient's breathing, and so single-layer image registration can, at best, align/register only one of lung tissue or bone tissue; single-layer image registration cannot yield an image in which both the lung tissue and the bone tissue are properly registered.

Figure 20:
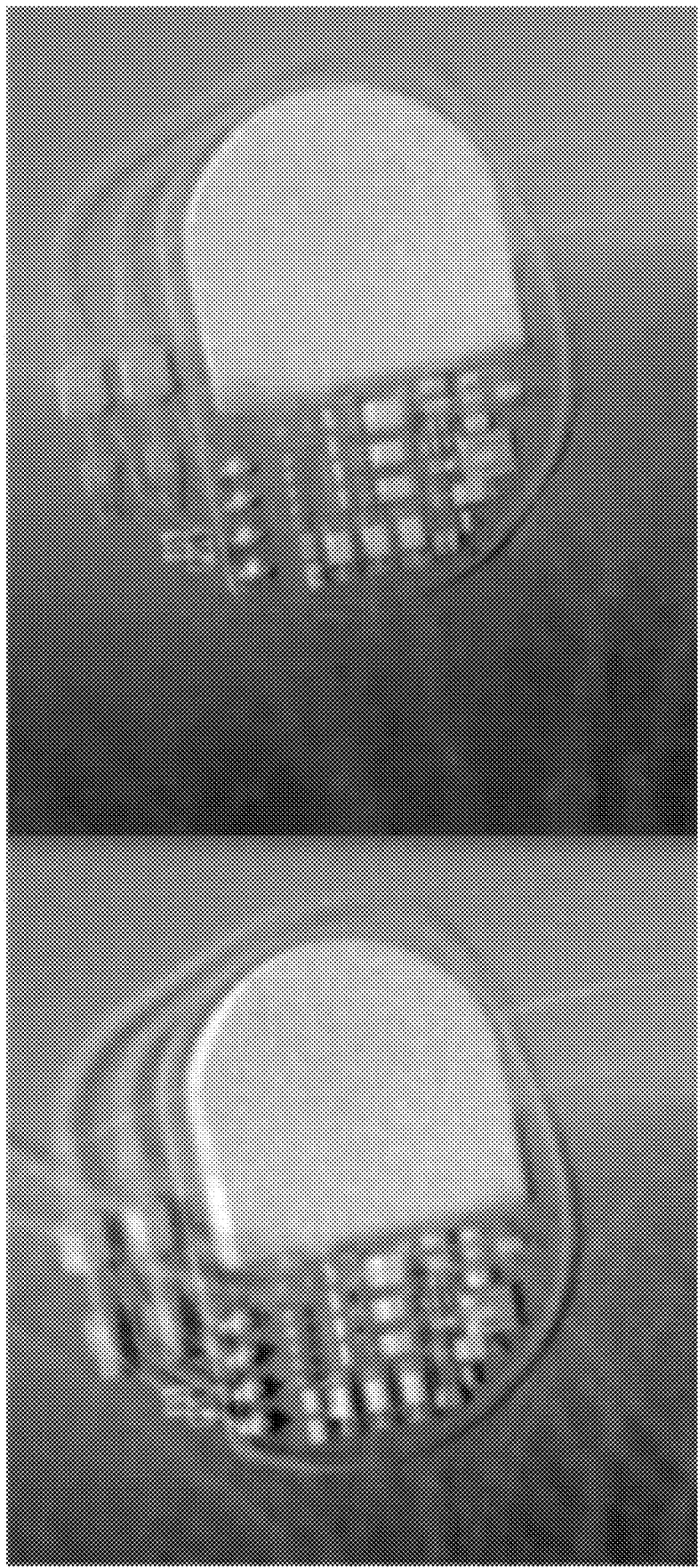

However, multi-layer image registration can solve these technical problems. This is shown in FIG. 20. As can be seen, FIG. 20 includes a zoomed-view 2002 of the patient's pacemaker when single-layer image registration is applied to align depicted soft-tissue. As can also be seen, FIG. 20 includes a zoomed-view 2004 of the patient's pacemaker when multi-layer image registration is applied. As shown, the zoomed-view 2002 depicts properly aligned soft tissue but also has various artefacts due to misaligned bone tissue (e.g., see shadows and/or distortions in the pacemaker). In contrast, the zoomed-view 2004 depicts both properly aligned soft tissue and properly aligned bone tissue. Indeed, as those having ordinary skill in the art will appreciate, the zoomed-view 2004 lacks the artefacts shown in the zoomed-view 2002 (e.g., the pacemaker is not distorted and has no shadows). FIG. 20 helps to demonstrate that multi-layer image registration achieves improved performance as compared to single-layer image registration.

Furthermore, the present inventors experimentally evaluated various embodiments described herein via the use of polyline landmarks. Such experimental evaluations showed that multi-layer image registration can achieve smaller landmark error as compared to single-layer image registration.

Figure 21:
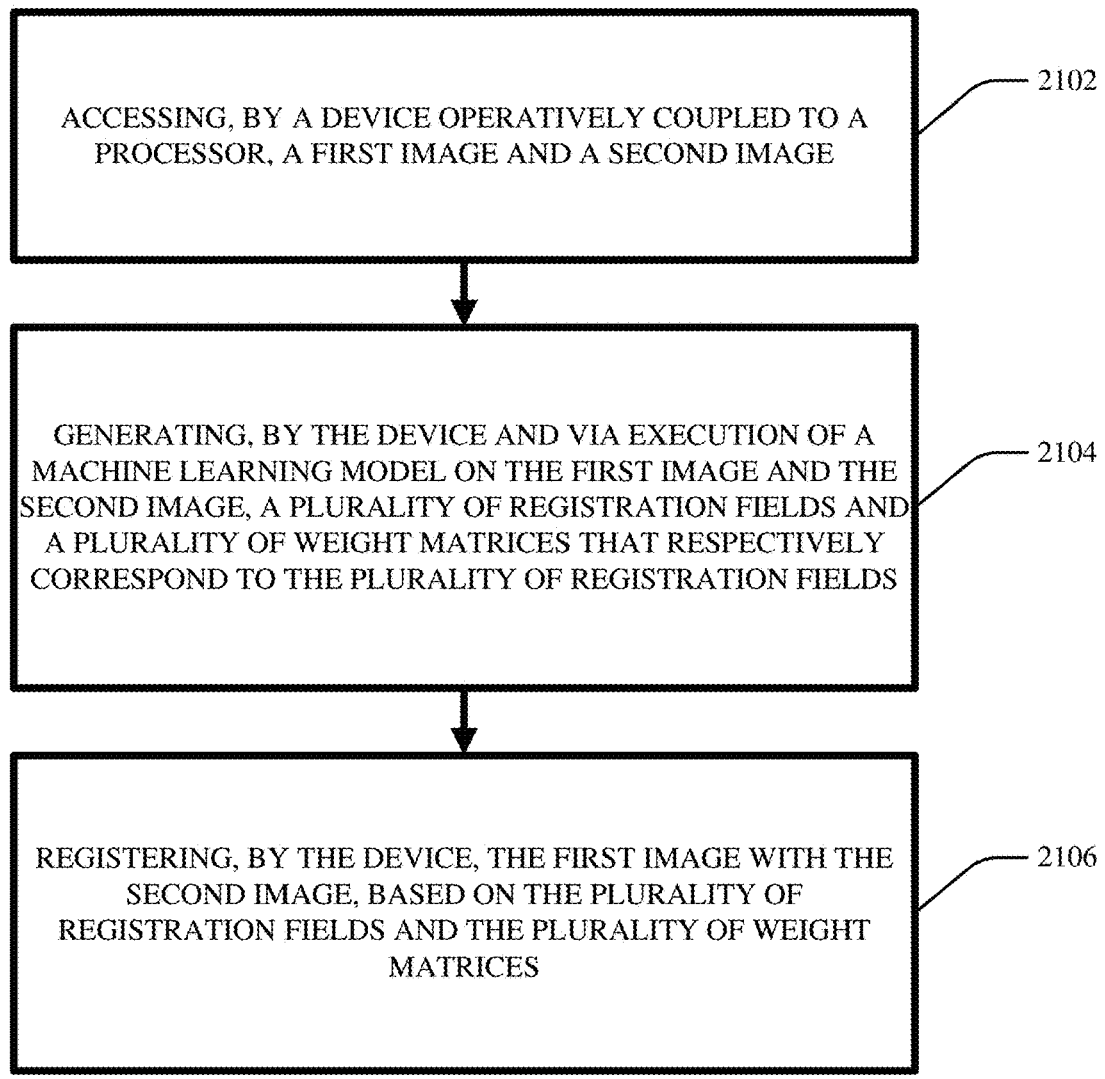
FIG. 21 illustrates a flow diagram of an example, non-limiting computer-implemented method that facilitates multi-layer image registration in accordance with one or more embodiments described herein.

FIG. 21 illustrates a flow diagram of an example, non-limiting computer-implemented method 2100 that can facilitate multi-layer image registration in accordance with one or more embodiments described herein. In various cases, the computer-implemented method 2100 can be facilitated by the multi-layer registration system 102.

In various embodiments, act 2102 can include accessing, by a device (e.g., via 112) operatively coupled to a processor, a first image (e.g., 104) and a second image (e.g., 106).

In various aspects, act 2104 can include generating, by the device (e.g., via 114) and via execution of a machine learning model (e.g., 202) on the first image and the second image, a plurality of registration fields (e.g., 204) and a plurality of weight matrices (e.g., 206) that respectively correspond to the plurality of registration fields.

In various instances, act 2106 can include registering, by the device (e.g., via 116), the first image with the second image, based on the plurality of registration fields and the plurality of weight matrices.

Although not explicitly shown in FIG. 21, a given registration field (e.g., registration field n in FIG. 3) in the plurality of registration fields can be a vector field indicating how pixels of the first image should be moved to facilitate registration with the second image, and a given weight matrix (e.g., weight matrix n) in the plurality of weight matrices that corresponds to the given registration field can indicate pixel-wise levels of importance of the given registration field.

Although not explicitly shown in FIG. 21, the machine learning model can be a deep learning neural network that receives as input the first image and the second image and that produces as output the plurality of registration fields and the plurality of weight matrices (e.g., as shown in FIG. 3).

Although not explicitly shown in FIG. 21, a given registration field in the plurality of registration fields can be rigid or deformable.

Although not explicitly shown in FIG. 21, the registering the first image with the second image can include: applying, by the device (e.g., via 116), the plurality of registration fields to the first image, thereby yielding a plurality of registered image layers (e.g., 502); and computing, by the device (e.g., via 116), a weighted sum of the plurality of registered image layers according to the plurality of weight matrices, wherein the weighted sum can be a version of the first image that is registered with the second image (e.g., as shown in FIG. 5).

Although not explicitly shown in FIG. 21, the registering the first image with the second image can include: applying, by the device (e.g., via 116), the plurality of weight matrices to the first image, thereby yielding a plurality of weighted image layers (e.g., 602); applying, by the device (e.g., via 116), the plurality of registration fields to the plurality of weighted image layers, thereby yielding a plurality of weighted and registered image layers (e.g., 504); and computing, by the device (e.g., via 116), a sum of the plurality of weighted and registered image layers, wherein the sum can be a version of the first image that is registered with the second image (e.g., as shown in FIG. 6).

Although not explicitly shown in FIG. 21, the computer-implemented method 2100 can further include: training, by the device (e.g., via 702), the machine learning model based on an error between the second image and a registered version of the first image (e.g., as shown in FIG. 9).

Although not explicitly shown in FIG. 21, the computer-implemented method 2100 can further include: training, by the device (e.g., via 702), the machine learning model based on at least one first error between at least one of the plurality of registration fields and at least one ground-truth registration field, or based on at least one second error between at least one of the plurality of weight matrices and at least one ground-truth weight matrix (e.g., as shown in FIG. 12).

Accordingly, various embodiments described herein include a computerized tool that can receive a movable image and a fixed image, and that can register the movable image with the fixed image by generating, via execution of a machine learning model, a plurality of registration fields and a plurality of weight matrices. As described herein, implementation of such multi-layer image registration can result in less significant and/or fewer image artefacts as compared to existing single-layer image registration techniques. Accordingly, the computerized tool described herein certainly constitutes a useful and practical application of computers.

Although the herein disclosure mainly describes various embodiments of the subject innovation as applying registration fields and/or weight matrices to the movable image 104 and not to the fixed image 106, this is a mere non-limiting example for ease of explanation. Those having ordinary skill in the art will appreciate that, in various embodiments, when it is desired to register one image (e.g., 104) with another (e.g., 106), both of such images can be shifted and/or transformed rather than just one of those images.

Although the herein disclosure mainly describes various embodiments of the subject innovation as applying to medical images (e.g., X-ray images, CT images, MRI images, ultrasound images, PET images), this is a mere non-limiting example for ease of explanation. Those having ordinary skill in the art will appreciate that the herein described teachings can be applied and/or extrapolated to any suitable images for which registration/alignment is desired.

In various instances, machine learning algorithms and/or models can be implemented in any suitable way to facilitate any suitable aspects described herein. To facilitate some of the above-described machine learning aspects of various embodiments of the subject innovation, consider the following discussion of artificial intelligence (AI). Various embodiments of the present innovation herein can employ artificial intelligence to facilitate automating one or more features of the present innovation. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect, compute) of the present innovation, components of the present innovation can examine the entirety or a subset of the data to which it is granted access and can provide for reasoning about or determine states of the system and/or environment from a set of observations as captured via events and/or data. Determinations can be employed to identify a specific context or action, or can generate a probability distribution over states, for example. The determinations can be probabilistic; that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, and so on)) schemes and/or systems (e.g., support vector machines, neural networks, expert systems, Bayesian belief networks, fuzzy logic, data fusion engines, and so on) in connection with performing automatic and/or determined action in connection with the claimed subject matter. Thus, classification schemes and/or systems can be used to automatically learn and perform a number of functions, actions, and/or determinations.

A classifier can map an input attribute vector, $z=(z_1, z_2, z_3, z_4, z_n)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) can be an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and/or probabilistic classification models providing different patterns of independence, any of which can be employed. Classification as used herein also is inclusive of statistical regression that is utilized to develop models of priority.

Those having ordinary skill in the art will appreciate that the herein disclosure describes non-limiting examples of various embodiments of the subject innovation. For ease of description and/or explanation, various portions of the herein disclosure utilize the term "each" when discussing various embodiments of the subject innovation. Those having ordinary skill in the art will appreciate that such usages of the term "each" are non-limiting examples. In other words, when the herein disclosure provides a description that is applied to "each" of some particular object and/or component, it should be understood that this is a non-limiting example of various embodiments of the subject innovation, and it should be further understood that, in various other embodiments of the subject innovation, it can be the case that such description applies to fewer than "each" of that particular object and/or component.

Figure 22:
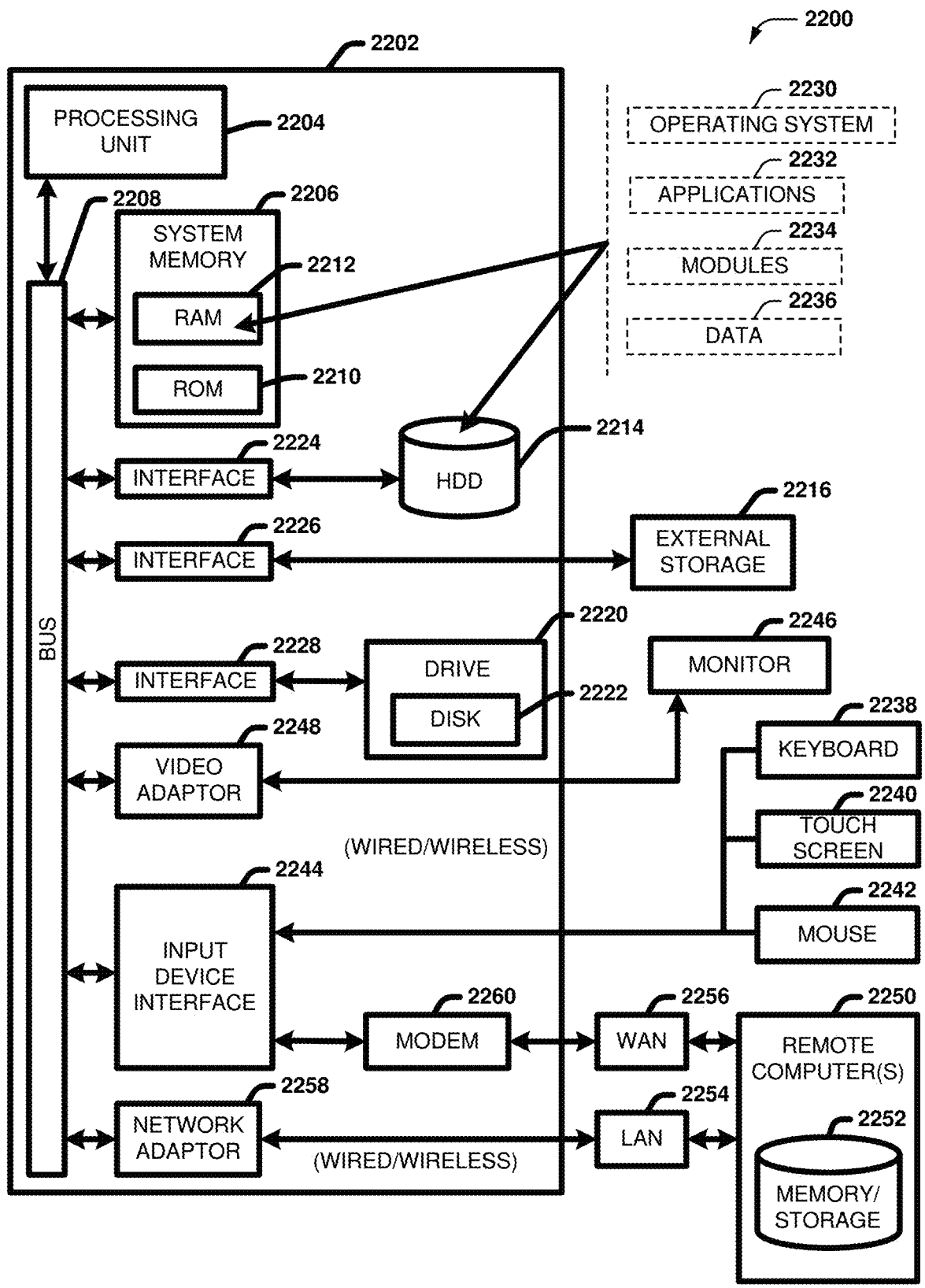
FIG. 22 illustrates a block diagram of an example, non-limiting operating environment in which one or more embodiments described herein can be facilitated.

In order to provide additional context for various embodiments described herein, FIG. 22 and the following discussion are intended to provide a brief, general description of a suitable computing environment 2200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 22, the example environment 2200 for implementing various embodiments of the aspects described herein includes a computer 2202, the computer 2202 including a processing unit 2204, a system memory 2206 and a system bus 2208. The system bus 2208 couples system components including, but not limited to, the system memory 2206 to the processing unit 2204. The processing unit 2204 can be any of various commercially available processors. Dual microprocessors and other multi-processor architectures can also be employed as the processing unit 2204.

The system bus 2208 can be any of several types of bus structure that can further interconnect to a memory bus (with or without a memory controller), a peripheral bus, and a local bus using any of a variety of commercially available bus architectures. The system memory 2206 includes ROM 2210 and RAM 2212. A basic input/output system (BIOS) can be stored in a non-volatile memory such as ROM, erasable programmable read only memory (EPROM), EEPROM, which BIOS contains the basic routines that help to transfer information between elements within the computer 2202, such as during startup. The RAM 2212 can also include a high-speed RAM such as static RAM for caching data.

The computer 2202 further includes an internal hard disk drive (HDD) 2214 (e.g., EIDE, SATA), one or more external storage devices 2216 (e.g., a magnetic floppy disk drive (FDD) 2216, a memory stick or flash drive reader, a memory card reader, etc.) and a drive 2220, e.g., such as a solid state drive, an optical disk drive, which can read or write from a disk 2222, such as a CD-ROM disc, a DVD, a BD, etc. Alternatively, where a solid state drive is involved, disk 2222 would not be included, unless separate. While the internal HDD 2214 is illustrated as located within the computer 2202, the internal HDD 2214 can also be configured for external use in a suitable chassis (not shown). Additionally, while not shown in environment 2200, a solid state drive (SSD) could be used in addition to, or in place of, an HDD 2214. The HDD 2214, external storage device(s) 2216 and drive 2220 can be connected to the system bus 2208 by an HDD interface 2224, an external storage interface 2226 and a drive interface 2228, respectively. The interface 2224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 2202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 2212, including an operating system 2230, one or more application programs 2232, other program modules 2234 and program data 2236. All or portions of the operating system, applications, modules, and/or data can also be cached in the RAM 2212. The systems and methods described herein can be implemented utilizing various commercially available operating systems or combinations of operating systems.

Computer 2202 can optionally comprise emulation technologies. For example, a hypervisor (not shown) or other intermediary can emulate a hardware environment for operating system 2230, and the emulated hardware can optionally be different from the hardware illustrated in FIG. 22. In such an embodiment, operating system 2230 can comprise one virtual machine (VM) of multiple VMs hosted at computer 2202. Furthermore, operating system 2230 can provide runtime environments, such as the Java runtime environment or the .NET framework, for applications 2232. Runtime environments are consistent execution environments that allow applications 2232 to run on any operating system that includes the runtime environment. Similarly, operating system 2230 can support containers, and applications 2232 can be in the form of containers, which are lightweight, standalone, executable packages of software that include, e.g., code, runtime, system tools, system libraries and settings for an application.

Further, computer 2202 can be enable with a security module, such as a trusted processing module (TPM). For instance with a TPM, boot components hash next in time boot components, and wait for a match of results to secured values, before loading a next boot component. This process can take place at any layer in the code execution stack of computer 2202, e.g., applied at the application execution level or at the operating system (OS) kernel level, thereby enabling security at any level of code execution.

A user can enter commands and information into the computer 2202 through one or more wired/wireless input devices, e.g., a keyboard 2238, a touch screen 2240, and a pointing device, such as a mouse 2242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 2204 through an input device interface 2244 that can be coupled to the system bus 2208, but can be connected by other interfaces, such as a parallel port, an IEEE 1394 serial port, a game port, a USB port, an IR interface, a BLUETOOTH® interface, etc.

A monitor 2246 or other type of display device can be also connected to the system bus 2208 via an interface, such as a video adapter 2248. In addition to the monitor 2246, a computer typically includes other peripheral output devices (not shown), such as speakers, printers, etc.

The computer 2202 can operate in a networked environment using logical connections via wired and/or wireless communications to one or more remote computers, such as a remote computer(s) 2250. The remote computer(s) 2250 can be a workstation, a server computer, a router, a personal computer, portable computer, microprocessor-based entertainment appliance, a peer device or other common network node, and typically includes many or all of the elements described relative to the computer 2202, although, for purposes of brevity, only a memory/storage device 2252 is illustrated. The logical connections depicted include wired/wireless connectivity to a local area network (LAN) 2254 and/or larger networks, e.g., a wide area network (WAN) 2256. Such LAN and WAN networking environments are commonplace in offices and companies, and facilitate enterprise-wide computer networks, such as intranets, all of which can connect to a global communications network, e.g., the Internet.

When used in a LAN networking environment, the computer 2202 can be connected to the local network 2254 through a wired and/or wireless communication network interface or adapter 2258. The adapter 2258 can facilitate wired or wireless communication to the LAN 2254, which can also include a wireless access point (AP) disposed thereon for communicating with the adapter 2258 in a wireless mode.

When used in a WAN networking environment, the computer 2202 can include a modem 2260 or can be connected to a communications server on the WAN 2256 via other means for establishing communications over the WAN 2256, such as by way of the Internet. The modem 2260, which can be internal or external and a wired or wireless device, can be connected to the system bus 2208 via the input device interface 2244. In a networked environment, program modules depicted relative to the computer 2202 or portions thereof, can be stored in the remote memory/storage device 2252. It will be appreciated that the network connections shown are example and other means of establishing a communications link between the computers can be used.

When used in either a LAN or WAN networking environment, the computer 2202 can access cloud storage systems or other network-based storage systems in addition to, or in place of, external storage devices 2216 as described above, such as but not limited to a network virtual machine providing one or more aspects of storage or processing of information. Generally, a connection between the computer 2202 and a cloud storage system can be established over a LAN 2254 or WAN 2256 e.g., by the adapter 2258 or modem 2260, respectively. Upon connecting the computer 2202 to an associated cloud storage system, the external storage interface 2226 can, with the aid of the adapter 2258 and/or modem 2260, manage storage provided by the cloud storage system as it would other types of external storage. For instance, the external storage interface 2226 can be configured to provide access to cloud storage sources as if those sources were physically connected to the computer 2202.

The computer 2202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 23:
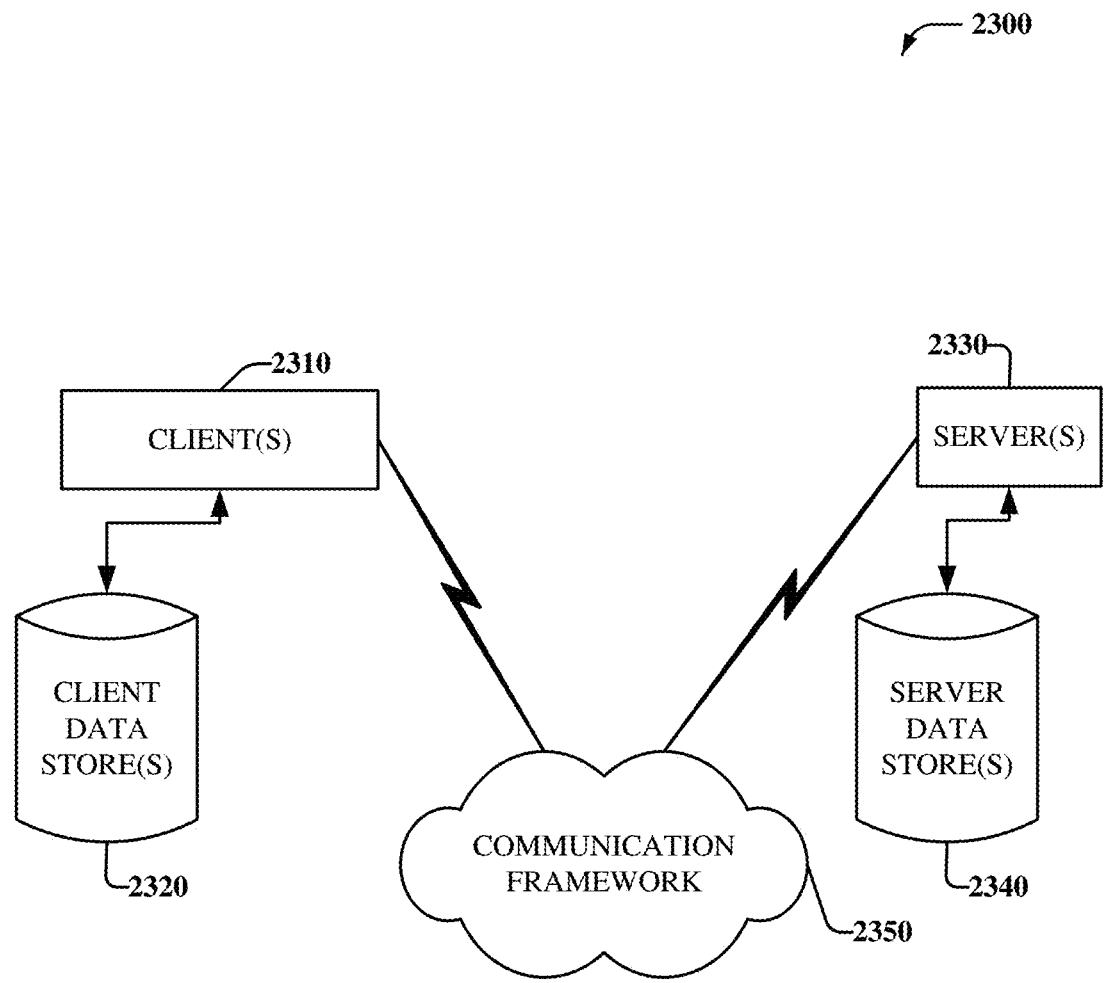
FIG. 23 illustrates an example networking environment operable to execute various implementations described herein.

FIG. 23 is a schematic block diagram of a sample computing environment 2300 with which the disclosed subject matter can interact. The sample computing environment 2300 includes one or more client(s) 2310. The client(s) 2310 can be hardware and/or software (e.g., threads, processes, computing devices). The sample computing environment 2300 also includes one or more server(s) 2330. The server(s) 2330 can also be hardware and/or software (e.g., threads, processes, computing devices). The servers 2330 can house threads to perform transformations by employing one or more embodiments as described herein, for example. One possible communication between a client 2310 and a server 2330 can be in the form of a data packet adapted to be transmitted between two or more computer processes. The sample computing environment 2300 includes a communication framework 2350 that can be employed to facilitate communications between the client(s) 2310 and the server(s) 2330. The client(s) 2310 are operably connected to one or more client data store(s) 2320 that can be employed to store information local to the client(s) 2310. Similarly, the server(s) 2330 are operably connected to one or more server data store(s) 2340 that can be employed to store information local to the servers 2330.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a processor that executes computer-executable components stored in a computer-readable memory, the computer-executable components comprising:
   a receiver component that accesses:
   a first image of a portion of a patient's body captured using a first energy level and a first exposure time, wherein the first image has a defined number of pixels in a defined arrangement, and
   a second image of the portion of the patient's body captured using a second energy level and a second exposure time, wherein the second image has the defined number of pixels in the defined arrangement, and wherein at least one of the second energy level is different from the first energy level, or the second exposure time is different from the first exposure time;
   a field component that generates, via execution of a machine learning model on the first image and the second image, a plurality of registration fields and a plurality of weight matrices that respectively correspond to the plurality of registration fields, wherein each registration field of the plurality of registration fields comprises respective pixel-wise shift vectors corresponding to each pixel of the first image, and wherein each weight matrix of the plurality of weight matrices comprises respective weight scalars corresponding to each pixel-wise shift vector of the corresponding registration field; and
   a registration component that generates a registered image of the portion of the patient's body from the first image with the second image based on the plurality of registration fields and the plurality of weight matrices.

2. The system of claim 1, wherein the respective weight scalars indicate respective levels of importance of the pixel-wise shift vectors.

3. The system of claim 1, wherein the machine learning model is a deep learning neural network.

4. The system of claim 1, wherein a registration field of the plurality of registration fields is rigid or deformable.

5. The system of claim 1, wherein the registration component generates the registered image by:

applying the plurality of registration fields to the first image, thereby yielding a plurality of registered image layers; and determining a weighted sum of the plurality of registered image layers according to the plurality of weight matrices.

6. The system of claim 1, wherein the registration component generates the registered image by:

applying the plurality of weight matrices to the first image, thereby yielding a plurality of weighted image layers;

applying the plurality of registration fields to the plurality of weighted image layers, thereby yielding a plurality of weighted and registered image layers; and determining a sum of the plurality of weighted and registered image layers.

7. The system of claim 1, wherein the computer-executable components further comprise:

a training component that trains the machine learning model based on an error between the second image and the registered image.

8. The system of claim 1, wherein the computer-executable components further comprise:

a training component that trains the machine learning model based on at least one first error between at least one of the plurality of registration fields and at least one ground-truth registration field, or based on at least one second error between at least one of the plurality of weight matrices and at least one ground-truth weight matrix.

9. A computer-implemented method, comprising:

accessing, by a device operatively coupled to a processor;

a first image of a portion of a patient's body captured using a first energy level and a first exposure time, wherein the first image has a defined number of pixels in a defined arrangement, and a second image of the portion of the patient's body captured using a second energy level and a second exposure time, wherein the second image has the defined number of pixels in the defined arrangement, and wherein at least one of the second energy level is different from the first energy level, or the second exposure time is different from the first exposure time;

generating, by the device via execution of a machine learning model on the first image and the second image, a plurality of registration fields and a plurality of weight matrices that respectively correspond to the plurality of registration fields, wherein each registration field of the plurality of registration fields comprises respective pixel-wise shift vectors corresponding to each pixel of the first image, and wherein each weight matrix of the plurality of weight matrices comprises respective weight scalars corresponding to each pixel-wise shift vector of the corresponding registration field; and generating, by the device, a registered image of the portion of the patient's body from the first image with the second image based on the plurality of registration fields and the plurality of weight matrices.

10. The computer-implemented method of claim 9, wherein the respective weight scalars indicate respective levels of importance of the pixel-wise shift vectors.

11. The computer-implemented method of claim 9, wherein the machine learning model is a deep learning neural network.

12. The computer-implemented method of claim 9, wherein a registration field of the plurality of registration fields is rigid or deformable.

13. The computer-implemented method of claim 9, wherein the generating the registered comprises:

applying the plurality of registration fields to the first image, thereby yielding a plurality of registered image layers; and determining a weighted sum of the plurality of registered image layers according to the plurality of weight matrices.

14. The computer-implemented method of claim 9, wherein the generating the registered comprises:

applying, by the device, the plurality of weight matrices to the first image, thereby yielding a plurality of weighted image layers;

applying, by the device, the plurality of registration fields to the plurality of weighted image layers, thereby yielding a plurality of weighted and registered image layers; and determining, by the device, a sum of the plurality of weighted and registered image layers.

15. The computer-implemented method of claim 9, further comprising:

training, by the device, the machine learning model based on an error between the second image and the registered image.

16. The computer-implemented method of claim 9, further comprising:

training, by the device, the machine learning model based on at least one first error between at least one of the plurality of registration fields and at least one ground-truth registration field, or based on at least one second error between at least one of the plurality of weight matrices and at least one ground-truth weight matrix.

17. A computer program product for facilitating multi-layer image registration, the computer program product comprising a computer-readable memory having program instructions embodied therewith, the program instructions executable by a processor to cause the processor to:

access a first image of a portion of a patient's body captured using a first energy level and a first exposure time, wherein the first image has a defined number of pixels in a defined arrangement;

access a second image of the portion of the patient's body captured using a second energy level and a second exposure time, wherein the second image has the defined number of pixels in the defined arrangement, and wherein at least one of the second energy level is different from the first energy level, or the second exposure time is different from the first exposure time;

generate, via execution of a machine learning model on the first image and the second image, a plurality of registration fields and a plurality of weight matrices that respectively correspond to the plurality of registration fields, wherein each registration field of the plurality of registration fields comprises respective pixel-wise shift vectors corresponding to each pixel of the first image, and wherein each weight matrix of the plurality of weight matrices comprises respective weight scalars corresponding to each pixel-wise shift vector of the corresponding registration field; and generate a registered image of the portion of the patient's body from the first image with the second image based on the plurality of registration fields and the plurality of weight matrices.

18. The computer program product of claim 17, wherein the generating the registered comprises:
- applying the plurality of registration fields to the first image, thereby yielding a plurality of registered image layers; and
- executing another machine learning model on the plurality of registered image layers.

19. The computer program product of claim 17, wherein the plurality of registration fields comprises at least one rigid registration field and at least one deformable registration field.

20. The computer program product of claim 17, wherein a registration field of the plurality of registration fields is rigid or deformable.

* * * * *